United States Patent [19]

Inaba et al.

[11] Patent Number: 6,154,737
[45] Date of Patent: Nov. 28, 2000

[54] DOCUMENT RETRIEVAL SYSTEM

[75] Inventors: Mitsuaki Inaba; Hideki Yasukawa, both of Toyko; Naohiko Noguchi, Yokohama; Yuji Kanno, Yokohama; Mitsuhiro Sato, Yokohama; Masako Nomoto, Tokorozawa, all of Japan

[73] Assignee: Matsushita Electric Industrial Co., Ltd., Osaka, Japan

[21] Appl. No.: 08/865,181

[22] Filed: May 29, 1997

[30]    Foreign Application Priority Data

May 29, 1996  [JP]  Japan ................................... 8-156418
Mar. 24, 1997 [JP]  Japan ................................... 9-087328

[51] Int. Cl.⁷ .................................................. G06F 17/30
[52] U.S. Cl. ...................................... 707/3; 707/5; 707/6
[58] Field of Search .................................. 707/5, 3, 6, 2, 707/4, 7; 395/51, 200.63; 364/900

[56]    References Cited

U.S. PATENT DOCUMENTS

| | | | |
|---|---|---|---|
| 3,694,813 | 9/1972 | Loh et al. | 340/172.5 |
| 4,674,066 | 6/1987 | Kucera | 364/900 |
| 4,930,077 | 5/1990 | Fan | 364/419 |
| 5,220,625 | 6/1993 | Hatakeyama et al. | 707/3 |
| 5,263,159 | 11/1993 | Mitsui | 707/3 |
| 5,321,833 | 6/1994 | Chang et al. | 707/5 |
| 5,404,514 | 4/1995 | Kageneck et al. | 707/3 |
| 5,408,655 | 4/1995 | Oren et al. | 707/5 |
| 5,416,892 | 5/1995 | Loken-kim | 395/51 |
| 5,440,481 | 8/1995 | Kostoff et al. | 707/5 |
| 5,523,945 | 6/1996 | Satoh et al. | 704/9 |
| 5,544,352 | 8/1996 | Egger | 707/3 |
| 5,642,502 | 6/1997 | Driscoll | 707/5 |
| 5,659,732 | 8/1997 | Kirsch | 707/5 |
| 5,701,399 | 12/1997 | Lee et al. | 395/51 |
| 5,706,498 | 1/1998 | Fujimiya et al. | 707/6 |
| 5,710,915 | 1/1998 | McElhiney | 707/3 |
| 5,717,913 | 2/1998 | Driscoll | 707/5 |
| 5,724,571 | 3/1998 | Woods | 707/5 |
| 5,761,496 | 6/1998 | Hattori | 707/5 |
| 5,765,150 | 6/1998 | Burrows | 707/5 |
| 5,781,898 | 7/1998 | Fukatsu et al. | 707/4 |
| 5,794,178 | 8/1998 | Caid et al. | 704/9 |
| 5,794,193 | 8/1998 | Gorin | 704/250 |
| 5,826,031 | 10/1998 | Nielsen | 395/200.63 |
| 5,826,260 | 10/1998 | Byrd, Jr. et al. | 707/5 |
| 5,920,854 | 7/1999 | Kirsch et al. | 707/3 |

FOREIGN PATENT DOCUMENTS 0 687 987  12/1995  European Pat. Off. .

OTHER PUBLICATIONS

"Wordij: A Word–Pair Approach to Information Retrieval" Danowski J A: NIST Special Publication, Mar. 1993.
"Use of Subject Field Codes From a Machine–Readable Dictionary for Automatic Classificationof Documents" Liddy E D et al., No Date.

Primary Examiner—Thomas G. Black
Assistant Examiner—Frantz Coby
Attorney, Agent, or Firm—Lowe Hauptman Gopstein Gilman & Berner

[57]    ABSTRACT

A document retrieval system for searching a document coinciding with a retrieval request the user inputs and further ranking the document in accordance with the degree of coincidence between the document and the retrieval request. In the document retrieval system, a word frequency calculating section finds out the number of documents where a word appears, a frequency of occurrence of the word in a document and obtains a weighting parameter for the word, and a frequency score calculating section obtains a frequency score on the basis of the output of the word frequency calculating section. In addition, a word cooccurrence relation checking section checks word cooccurrence relations of the retrieval request and the document, and a cooccurrence score calculating section calculates a cooccurrence score from the degree of coincidence therebetween. A document score calculating section calculates a document score on the basis of the frequency score and the cooccurrence score. The documents are ranked in order of document score and displayed to the user.

11 Claims, 29 Drawing Sheets

FIG. 29
PRIOR ART

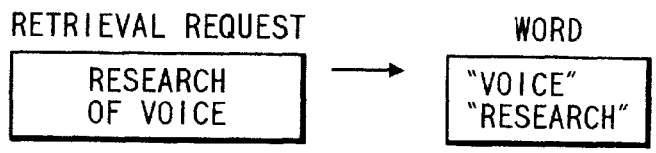

PRIOR RANKING BASED ON ONLY FREQUENCY INFORMATION

DOCUMENT NUMBER : 28651

FIRST RANK
| PERSONAL AFFAIRS COMMUNICATION NETWORK RESEARCH INSTITUTE TRAFFIC RESEARCH DIRECTOR ABC (RADIO SYSTEM RESEARCH INSTITUTE DIRECTOR) MULTIMEDIA RESEARCH INSTITUTE RESEARCH AND DEVELOPMENT DIRECTOR DFG (SAME SYSTEM RESEARCH DIRECTOR) ····· |

DOCUMENT NUMBER : 19220

SECOND RANK
| DETAILS OF RESEARCH DONE IN THE HIJ CHEMICAL RESEARCH INSTITUTE ARE DIFFERENT FROM THE TRADITIONAL CHEMICAL RESEARCH CONTENTS. THIS RESEARCH INSTITUTE PERFORMS A CHEMICAL RESEARCH UNKNOWN IN THE WORLD. |

DOCUMENTS AGAINST RETRIEVAL REQUEST

DOCUMENT NUMBER : 262124

142nd RANK
| THE KLM VOICE RESEARCH INSTITUTE WIDELY MAKES RESEARCHES ON VOICES. THE DETAILS OF THE RESEARCHES INCLUDES SPEECH RECOGNITION, VOICE SYNTHESIS, ····· |

DOCUMENT THE USER WANTS

DOCUMENT RETRIEVAL SYSTEM

BACKGROUND OF THE INVENTION

1. Field of the Invention

The present invention relates to a document retrieval system, and more particularly to a document retrieval system which searches documents coinciding with or corresponding to a retrieval request inputted by the user from among a large quantity of document data and ranks or classifies the documents on the basis of the degree of the coincidence therebetween.

2. Description of the Prior Art

The recent increase in the scale of the document data base which comes to a tremendous quantity frequently causes difficulty of easily searching the target document through the use of a prior key word searching technique or a global retrieval technique, and hence the reduction of the total retrieval time is not always possible even if it is capable of producing a retrieval result at a high speed. One possible way to accomplish the decrease in the number of the resultant documents may be to narrow down the candidates, such as additionally employing another key word, while difficulty is experienced to add appropriate key words so as not to miss the necessary documents. For this reason, in addition to paying attention to the presence or absence of the letter string (word) in the documents to be searched, there has known a noticeable method of ranking (sequencing) the searched documents on the basis of its frequency of occurrence to retrieve the target document with a high efficiency.

FIG. 27 is a block diagram showing an arrangement of a prior document retrieval system which sequences the retrieval results. As shown in FIG. 27, the document retrieval system is composed of document data 3101 under retrieval, a dictionary 3102, a word frequency index 3103 for retaining the frequencies of occurrence of the dictionary words in the document, a word frequency information extracting means 3104 for attaining the word occurrence frequency information from the document data 3101, a retrieval request inputting means 3105 for receiving a retrieval request inputted by the user, a word frequency calculating means 3106 for calculating the word occurrence frequency from the word frequency index 3103, a frequency score calculating means for calculating a frequency score of each document on the basis of the word occurrence frequency, a document score calculating means 3108 for calculating a document score indicative of the degree of coincidence between each document and the retrieval request on the basis of the frequency score, a document ranking means 3109 for rearranging the documents in the order of document score, and a retrieval result displaying means 3110 for displaying the resultant documents arranged in the order of score.

FIG. 28 is a flow chart showing a retrieval procedure a prior document retrieval system which sequences the retrieval results. First of all, before retrieval the word frequency information extracting means 3104 consults the document data 3101 to obtain word frequency information which in turn, is outputted together with the total number of documents and the number of occurring documents to the word frequency index 3103 where a word frequency index is made out in advance. At a step 4201, the user who intends to carry out the retrieval inputs the retrieval request through the retrieval request inputting means 3105, and at a step 4202, the word frequency calculating means 3106 refers to the word frequency index 3103 to calculate a frequency of occurrence $TF_{ij}$ of the dictionary word $W_i$ (i=1, 2, ..., NW where NW corresponds to the number of dictionary words included in the retrieval request) included in the retrieval request inputted through the retrieval request inputting means 3105 in a document $D_j$ (j=1, 2, ..., ND) and further to calculate the number of documents $ND_i$ in which that word appears.

Furthermore, at a step 4203 the frequency score calculating means 3107 calculates a frequency score $SF_j$ of the document $D_j$ according to an equation (1) on the basis of the output of the word frequency calculating means 3106.

$$SF_j = \sum_i (TF_{ij} \times IDF_i) \quad (1)$$

$$IDF_i = 1 - \log(ND_i / ND)$$

where $IDF_i$ designates a parameter representative of a bias of the word $W_i$ in all the documents.

Still further, a step 4204 the document score calculating means 3108 obtains a document score $S_j$ indicative of the degree of coincidence between the document $D_j$ and the retrieval request on the basis of the frequency score $SF_j$ of the document $D_j$ outputted from the frequency score calculating means 3107. In the prior retrieval system, the document score $S_j$ is the frequency score $SF_j$ as found from an equation (2).

$$S_j = SF_j \quad (2)$$

Moreover, at a step 4205 the document ranking means 3109 rearranges the retrieval results in the order of the document score calculated in the document score calculating means 3108, then followed by a step 4206 where the retrieval result displaying means 3110 shows the retrieval results to the user.

However, according to the above-mentioned prior arrangement, in cases where as shown in FIG. 29 one word included in the retrieval request occurs at an extremely high frequency, a problem arises in that even a document against the user's retrieving intention is ranked with a higher order. In addition, since the calculation of the score used for ranking the documents under retrieval is made in units of document irrespective of its field, it becomes difficult that the information such as the heading of a paper article or the title of an invention in the patent application is put to practical use.

Besides, there are various problems: in the case of making a plurality of retrieval requests, the priority can not be given to these retrieval requests to make it difficult to flexibly express the user's requests; in the case that a group of words including all the necessary words is given as the retrieval request, if one word occurs at an extremely high frequency, that document comes to a high order; and difficulty is encountered to express a group of words, requiring the occurrence in the close condition, as the retrieval request and to search them.

SUMMARY OF THE INVENTION

It is therefore an object of the present invention to provide a document retrieval system which flexibly receives a retrieval request from the user and conducts the retrieving and ranking operations to produce a precise retrieval result with less refuse (unnecessary data) and which is capable to shortening the retrieval time as a whole by such a manner as to narrow down the retrieval result.

In accordance with an aspect of the present invention, a document retrieval system which searches a target document to be retrieved (which will be referred hereinafter to as a target document) in response to a retrieval request and ranks the retrieval result comprises an index for retaining a word occurrence frequency and word cooccurrence information in the target document, a plurality of retrieval request inputting means, and a word cooccurrence relation checking means for seeing if a word cooccurrence relation included in the retrieval request exists in the target document, wherein a plurality of retrieval requests having different precedence are inputted by the user and a score to be given to the target document where the word cooccurrence relation arises is increased and the documents are displaced preferentially. This allows an accurate retrieval of a document the user wants.

In accordance with another aspect of this invention, in a document retrieval system which searches a target document in response to a retrieval request and ranks the retrieval result, a plurality of retrieval request inputting means are provided so that the user inputs a plurality of retrieval requests having different precedence (priorities), with the result that the retrieval of the document the user wants becomes possible with a high accuracy.

In accordance with a different aspect of this invention, a document retrieval system which searches a target document in response to a retrieval request and ranks the retrieval result has index information for each of a plurality of fields of a target document, and comprises a field rate inputting means for allowing the user to specify the rate of a field influencing (weighting) the ranking of the retrieved documents. This permits the user to specify the rate of influencing the ranking of the target document at every field, with the result that the retrieval of the document the user wants becomes possible with a high accuracy.

In accordance with a different aspect of this invention, a document retrieval system which searches a target document in response to a retrieval request and ranks the retrieval result comprises an occurrence word number calculating means for calculating the number of words of a plurality of words of the retrieval request which also appear in the target document. In cases where the plurality of words included in the retrieval request simultaneously appear in the target document, a score to be given to the target document retrieved is increased and the target document is displayed preferentially. Thus, the retrieval of the document the user wants becomes possible with a high accuracy.

In accordance with a different aspect of this invention, a document retrieval system which ranks a target document in response to a retrieval request and ranks the retrieval result comprises an index including a word occurrence frequency and a word occurrence position in the target document, and a word proximity calculating means for calculating the degree of proximity (approach) of occurrence positions of a plurality of words of the retrieval request in the target document so that a score to be given to the target document is increased in accordance with the degree of proximity and the target document is displayed preferentially. Accordingly, the retrieval of the document the user wants becomes possible with a high accuracy.

Furthermore, in accordance with the present invention, there is provided a document retrieval system which searches a target document to be retrieved in response to a retrieval request and ranks retrieval results, comprising: a word frequency index for storing a frequency of occurrence of a dictionary word in the target document; a word cooccurrence index for storing word cooccurrence information appearing in the target document; word frequency information extracting means for extracting word frequency information from document data to be retrieved to store it in the word frequency index; word cooccurrence information extracting means for extracting word cooccurrence information from the document data to store it in the word cooccurrence index; retrieval request inputting means through which the user inputs the retrieval request; word frequency calculating means for consulting the word frequency index to obtain an occurrence frequency of a dictionary word, included in the retrieval request inputted through the retrieval request inputting means, in a document of the document data; frequency score calculating means for calculating a frequency score of the document indicative of a degree of coincidence between the retrieval request and the document on the basis of the word occurrence frequency obtained through the word frequency calculating means; word cooccurrence information extracting means for extracting word cooccurrence information from the retrieval request; word cooccurrence relation checking means for referring to the word cooccurrence index to find out how many word cooccurrence relations included in the retrieval request and outputted from the word cooccurrence information extracting means appear in the document; cooccurrence score calculating means for calculating a cooccurrence score of the document on the basis of a quantity of the word cooccurrence relation appearing in common in the retrieval request and the document; document score calculating means for calculating a document score on the basis of the output of the frequency score calculating means and the output of the cooccurrence score calculating means; document ranking means for rearranging the target documents being retrieval results in the order of score obtained by the document score calculating means; and retrieval result displaying means for displaying the retrieval results ranked.

In accordance with this invention, there is provided a document retrieval system which searches a target document to be retrieved in response to a retrieval request and ranks retrieval results, comprising: a word frequency index for storing a frequency of occurrence of a dictionary word in the target document; word frequency information extracting means for extracting word frequency information from document data to be retrieved to store it in the word frequency index; primary retrieval request inputting means for allowing the user to input a first retrieval request to be dealt with preferentially; secondary retrieval request inputting means for allowing the user to input a second retrieval request having a lower precedence than that of the first retrieval request; word frequency calculating means for consulting the word frequency index to obtain a frequency of occurrence of a dictionary word, included in the first and second retrieval requests, in a document of the document data; frequency score calculating means for calculating a frequency score of the document indicative of a degree of coincidence between the document and one of the first and second retrieval requests on the basis of the word occurrence frequency obtained in the word frequency calculating means; document score calculating means for calculating a document score of the document indicative of the document and the first and second retrieval requests on the basis of the frequency score outputted from the frequency score calculating means; document ranking means for rearranging the target documents being retrieval results in the order of score obtained by the document score calculating means; and retrieval result displaying means for displaying the retrieval results ranked.

In accordance with this invention, there is provided a document retrieval system which searches a target document to be retrieved in response to a retrieval request and ranks retrieval results, comprising: a field word frequency index for storing a frequency of occurrence of a dictionary word in the target document at every field; word frequency information extracting means for extracting word frequency information from document data to be retrieved and for putting it in the field word frequency index; retrieval request inputting means for allowing the user to input the retrieval request; field rate inputting means for allowing the user to input a rate indicative of a degree of influence of a score of a field of a document on a document score; field word frequency calculating means for consulting the field word frequency index in terms of a dictionary word included in the retrieval request to obtain a frequency of occurrence of the dictionary word in the document at every field; field frequency score calculating means for calculating a frequency score indicative of a degree of coincidence between a field of each document and the retrieval request on the basis of the word occurrence frequency acquired in the field word frequency calculating means; document score calculating means for calculating a document score indicative of a degree of coincidence between the document and the retrieval request on the basis of the word occurrence frequency of the field outputted from the field frequency score calculating means and the rate inputted to the field rate inputting means; document ranking means for rearranging the target documents being retrieval results in the order of score obtained by the document score calculating means; and retrieval result displaying means for displaying the retrieval results ranked.

In accordance with this invention, there is provided a document retrieval system which searches a target document to be retrieved in response to a retrieval request and ranks retrieval results, comprising: a word frequency index for storing a frequency of occurrence of a dictionary word in the target document; word frequency information extracting means for deriving word frequency information from document data to be retrieved and further for storing it in the word frequency index; retrieval request inputting means through which the user inputs the retrieval request; word frequency calculating means for consulting the word frequency index to calculate a frequency of occurrence of a dictionary word, included in the target request, in a document of the document data; frequency score calculating means for calculating a score of the document indicative of a degree of coincidence between the document and the retrieval request on the basis of the word occurrence frequency attained in the word frequency calculating means; occurrence word number calculating means for referring to the word frequency index to find out how many words of words included in the retrieval request appear in the document; occurrence word score calculating means for obtaining an occurrence word score to be added to the document on the basis of the number of occurrence words attained in the occurrence word number calculating means; document score calculating means for calculating a document score of the document indicative of a degree of coincidence between the retrieval request and the document on the basis of the frequency score outputted from the frequency score calculating means and the occurrence word score outputted from the occurrence word number score calculating means; document ranking means for rearranging the target documents being retrieval results in the order of score obtained by the document score calculating means; retrieval result displaying means for displaying the retrieval results ranked.

In accordance with this invention, there is provided a document retrieval system which searches a target document to be retrieved in response to a retrieval request and ranks retrieval results, comprising: a word frequency index for storing a frequency of occurrence of a dictionary word in the target document; a word occurrence position index for storing a position of a word appearing in the target document; word frequency information extracting means for extracting word frequency information from document data to be retrieved and further for storing it in the word frequency index; word occurrence position information extracting means for acquiring word position information from the document data and further for retaining it in the word occurrence position index; retrieval request inputting means through which the user inputs the retrieval request; word frequency calculating means for consulting the word frequency index to calculate an occurrence frequency of a dictionary word, included in the retrieval request, in a document of the document data; frequency score calculating means for obtaining a score of the document indicative of a degree of coincidence between the document and the retrieval request on the basis of the word occurrence frequency attained in the word frequency calculating means; occurrence position calculating means for referring to the word occurrence position index to obtain an occurrence position of a word, included in the retrieval request, in the document; word proximity calculating means for calculating a degree of proximity between words of the document on the basis of the word occurrence positions outputted from the word occurrence position calculating means; proximity score calculating means for attaining a proximity score to be given to the document, on the basis of the degree of proximity outputted from the word proximity calculating means; document score calculating means for calculating a score of the document indicative of a degree of coincidence between the document and the retrieval request on the basis of the frequency score outputted from the frequency score calculating means and the proximity score outputted from the proximity score calculating means; document ranking means 914 for rearranging the target documents being retrieval results in the order of score obtained by the document score calculating means; and retrieval result displaying means displaying the retrieval results ranked.

In accordance with a different aspect of this invention, a document retrieval system which searches a target document in response to a retrieval request and ranks the retrieval result comprises an index for including a word occurrence frequency and word cooccurrence information in the target document at every field, a field rate inputting means for allowing the user to specify a rate of a field influencing on the ranking of the target document, and a field word cooccurrence relation checking means for checking whether or not a word cooccurrence relation included in the retrieval request appears in the target document, wherein a score to be given to the target document where the word cooccurrence relation appears is increased at every field so that the target document is displayed preferentially. This permits the document the user wants to be retrieved with a high accuracy.

In accordance with a different aspect of this invention, a document retrieval system which searches a target document to be retrieved in response to a retrieval request and ranks retrieval results comprises an index including a word occurrence frequency and word cooccurrence information in the target document, an occurrence word calculating means for calculating the number of words of a plurality of words of the retrieval request which also appear in the target document, and a word cooccurrence relation checking means for checking whether or not a word cooccurrence relation included in the retrieval request appears in the target document, wherein in cases where the plurality of words included in the retrieval request simultaneously appear in the target document and the word cooccurrence relation appears in the target document, a score to be given to the target document is increased so that the target document is displayed preferentially. This arrangement permits the document the user wants to be retrieved with a high accuracy.

Moreover, in accordance with the present invention, there is provided a document retrieval system which searches a target document to be retrieved in response to a retrieval request and ranks retrieval results, comprising: a word frequency index for storing a frequency of occurrence of a dictionary word in the target document; a word cooccurrence index for storing word cooccurrence information appearing in the target document; word frequency information extracting means for extracting word frequency information from document data prepared and further for putting the extracted word frequency information in the word frequency index; word cooccurrence information extracting means for extracting word cooccurrence information from the document data and further for putting the extracted word cooccurrence information in the word cooccurrence index; primary retrieval request inputting means for allowing the user to input a primary retrieval request the user attaches importance to; secondary retrieval request inputting means for allowing the user to input a secondary retrieval request the user attaches lower importance to as compared with the primary retrieval request; word frequency calculating means for consulting the word frequency index to attain a frequency of occurrence of a dictionary word, included in the retrieval requests inputted through the primary retrieval request inputting means and the secondary retrieval request inputting means, in a document; frequency score calculating means for calculating a frequency score of each document on the basis of the word occurrence frequency attained in the word frequency calculating means; word cooccurrence information extracting means for extracting word cooccurrence information from the retrieval requests inputted through the primary retrieval request inputting means and the secondary retrieval request inputting means; word cooccurrence relation checking means for referring to the contents of the word cooccurrence index to obtain the number of word cooccurrence relations included in the retrieval requests outputted from the word cooccurrence information extracting means and appearing in the document; cooccurrence score calculating means for obtaining a cooccurrence score of the document on the basis of the number of word cooccurrence relations attained by the word cooccurrence relation checking means and appearing in common in the retrieval requests and the document; document score calculating means for calculating a final score for the document on the basis of the frequency score outputted from the frequency score calculating means and the cooccurrence score outputted from the cooccurrence score calculating means; document ranking means for rearranging the target documents being retrieval results in the order of score obtained by the document score calculating means; and retrieval result displaying means for displaying the retrieval results ranked.

In accordance with the present invention, there is provided a document retrieval system which searches a target document to be retrieved in response to a retrieval request and ranks retrieval results, comprising: a field word frequency index for storing a frequency of occurrence of a dictionary word in the target document at every field; a field word cooccurrence index for storing word cooccurrence information appearing in the target document at every field; word frequency information extracting means for extracting word frequency information from document data prepared and for putting the word frequency information in the field word frequency index; word cooccurrence information extracting means for extracting word cooccurrence information from the document data and for putting the word cooccurrence information in the field word cooccurrence index; retrieval request inputting means through which the user inputs the retrieval request; field word frequency calculating means for consulting the field word frequency index to find out a frequency of occurrence of a dictionary word included in the retrieval request inputted through the retrieval request inputting means at every field in a document; field frequency score calculating means for obtaining a frequency score at every field of the document on the basis of the word occurrence frequency obtained in the field word frequency calculating means; word cooccurrence information extracting means for extracting word cooccurrence information from the retrieval request inputted through the retrieval request inputting means; field word cooccurrence relation checking means for referring to the contents of the field word cooccurrence index to find out the number of word cooccurrence relations included in the retrieval request outputted from the word cooccurrence information extracting means and appearing in a field of the document; field cooccurrence score calculating means for calculating a cooccurrence score at every field of the document on the basis of the number of word cooccurrence relations appearing in common in the field of the document and the retrieval request which is obtained in the field word cooccurrence relation checking means; field rate inputting means through which the user inputs a rate representative of the degree of influence of a score of the field on the ranking of the document; document score calculating means for calculating a final score for the document on the basis of the frequency score outputted from the field frequency score calculating means, the cooccurrence score outputted from the field cooccurrence score calculating means and the rate outputted from the field rate inputting means; document ranking means for rearranging the target documents being retrieval results in the order of score obtained by the document score calculating means; and retrieval result displaying means for displaying the retrieval results ranked.

In accordance with the present invention, there is provided a document retrieval system which searches a target document to be retrieved in response to a retrieval request and ranks retrieval results, comprising: a word frequency index for storing a frequency of occurrence of a dictionary word in the target document; a word cooccurrence index for storing word cooccurrence information occurring in the target document; word frequency information extracting means for extracting word frequency information from document data prepared and for storing the word frequency information in the word frequency index; word cooccurrence information extracting means for extracting word cooccurrence information from the document data to put the word cooccurrence information in the word cooccurrence index; retrieval request inputting means through which the user inputs the retrieval request; word frequency calculating means for consulting the word frequency index to calculate a frequency of occurrence of a dictionary word, included in the retrieval request inputted through the retrieval request inputting means, in a document; frequency score calculating means for obtaining a frequency score of the document on the basis of the word frequency obtained by the word frequency calculating means; occurrence word number calculating means for consulting the word frequency index to obtain the number of dictionary words included in the retrieval request inputted through the retrieval request inputting means and appearing in the document; occurrence word number score calculating means for calculating an occurrence word number score on the basis of the number of occurrence words obtained by the occurrence word number calculating means; word cooccurrence information extracting means for extracting word cooccurrence information from the retrieval request inputted through the retrieval request inputting means; word cooccurrence relation checking means for referring to the contents of the word cooccurrence index to calculate the number of word cooccurrence relations of the word cooccurrence relations of the retrieval request outputted from the word cooccurrence information extracting means which appears in the document; cooccurrence score calculating means for obtaining a cooccurrence score of the document on the basis of the number of word cooccurrence relations occurring in common in the retrieval request and the document which is obtained by the word cooccurrence relation checking means; document score calculating means for calculating a final score of the document on the basis of the frequency score outputted from the frequency score calculating means, the occurrence word number score outputted from the occurrence word number score calculating means and the cooccurrence score outputted from the cooccurrence score calculating means; document ranking means for rearranging the target documents being retrieval results in the order of score obtained by the document score calculating means; and retrieval result displaying means for displaying the retrieval results ranked.

BRIEF DESCRIPTION OF THE DRAWINGS

The object and features of the present invention will become more readily apparent from the following detailed description of the preferred embodiments taken in conjunction with the accompanying drawings in which:

FIG. 29 is an illustration of an example of retrievals of the prior document retrieval system.

DETAILED DESCRIPTION OF THE INVENTION

Embodiments of the present invention will be described hereinbelow with reference to the drawings.

First Embodiment

Figure 1:
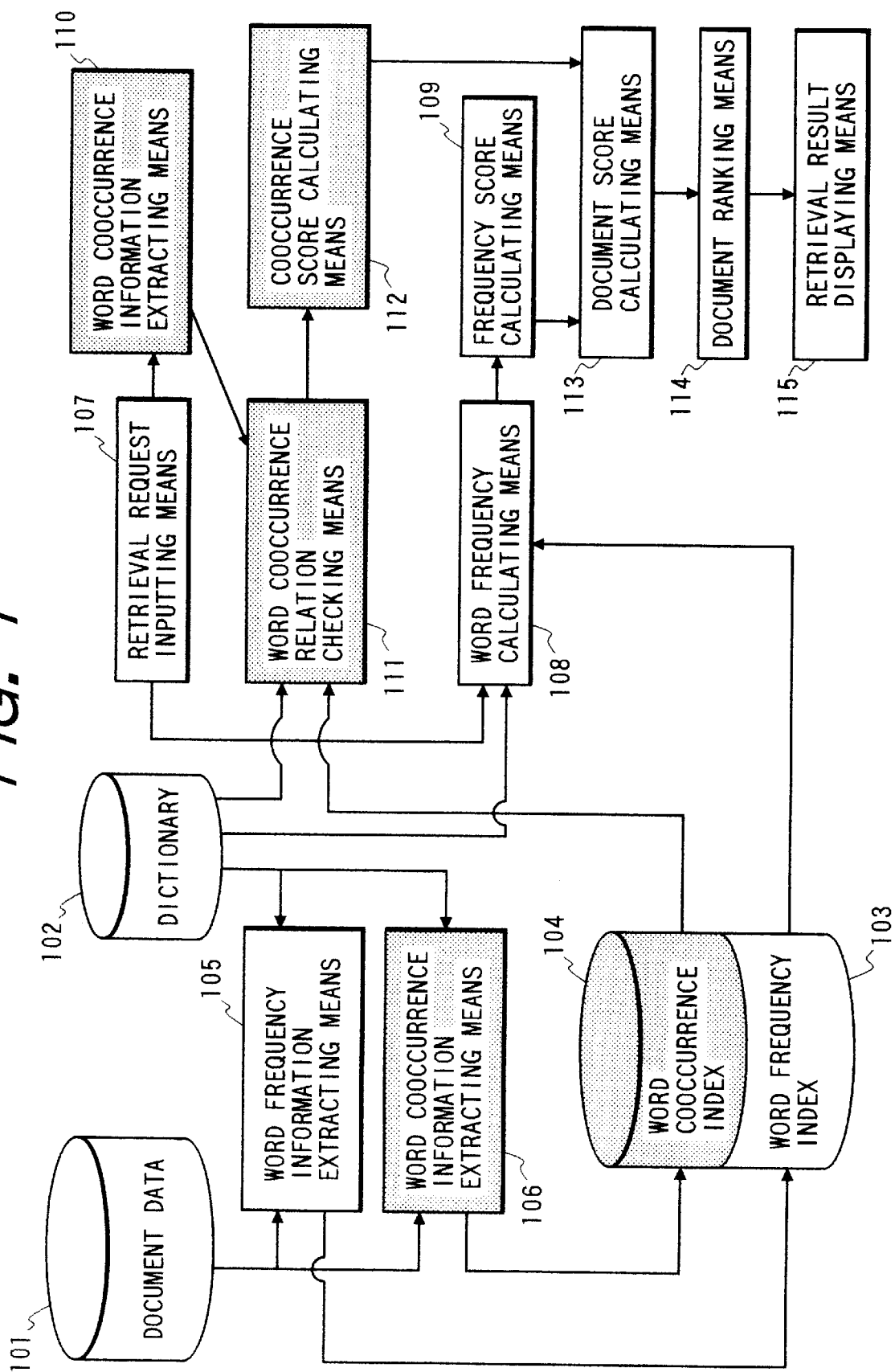
FIG. 1 is a block diagram showing an arrangement of a document retrieval system according to a first embodiment of the present invention.

FIG. 1 is a block diagram showing an arrangement of a document retrieval system according to a first embodiment of the present invention. In FIG. 1, the document retrieval system comprises document data 101 subjected to retrieval, a dictionary 102, a word frequency index 103 for retaining an occurrence frequency of a dictionary word in a target document, a word cooccurrence index 104 for storing word cooccurrence information appearing in the target document, a word frequency information extracting means 105 for extracting word frequency information from the document data 101 and further for storing it in the word frequency index 103, a word cooccurrence information extracting means 106 for extracting the word cooccurrence information from the document data 101 and further for retaining it in the word cooccurrence index 104, a retrieval request inputting means 107 through which the user inputs a retrieval request, a word frequency calculating means 108 for consulting the word frequency index 103 to obtain an occurrence frequency of a dictionary word, included in the retrieval request inputted through the retrieval request inputting means 107, in the document, a frequency score calculating means 109 for calculating a frequency score of each of the documents on the basis of the word frequency obtained through the word frequency calculating means 108, a word cooccurrence information extracting means 110 for extracting the word cooccurrence information from the retrieval request inputted through the retrieval request inputting means 107, a word cooccurrence relation checking means 111 for referring to the contents of the word cooccurrence index 104 to find out how many word cooccurrence relations included in the retrieval request the word cooccurrence information extracting means 110 outputs appear in each document, a cooccurrence score calculating means 112 for calculating a cooccurrence score of each document on the basis of the degree of the word cooccurrence relation appearing in common in the retrieval request and the document and obtained by the word cooccurrence relation checking means 111, a document score calculating means 113 for calculating a document score on the basis of the output of the frequency score calculating means 109 and the output of the cooccurrence score calculating means 112, a document ranking means 114 for rearranging the documents in the order of score, and a retrieval result displaying means 115 for displaying the resultant documents arranged in the order of score.

Figure 2:
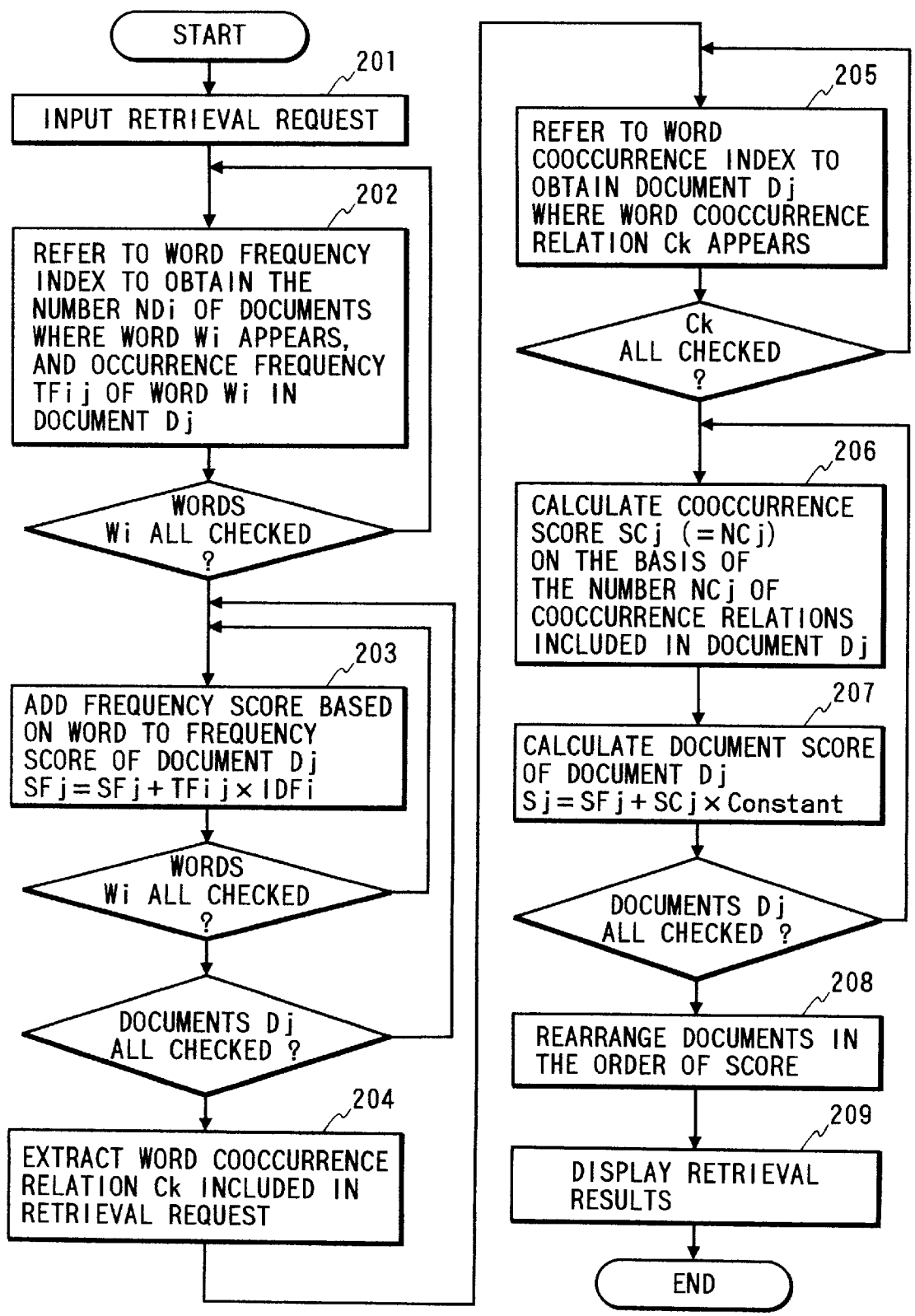
FIG. 2 is a flow chart showing a retrieval procedure of the document retrieval system according to the first embodiment of this invention.

FIG. 2 is a flow chart showing a retrieval operation of the document retrieval system according to the first embodiment of this invention. Prior to the retrieval, the word frequency information extracting means 105 scans the document data 101 in advance to find out word frequency information which in turn, is outputted together with the total number of documents and the number of documents where that word exists to the word frequency index 103, while the word cooccurrence information extracting means 106 scans the document data 101 to obtain word cooccurrence information in each of the documents and output it to the word cooccurrence index 104 to make an index out. As a method of attaining the word cooccurrence information, for example there is a way of deciding that a pair of words appearing in the same sentence are in a cooccurrence relation to each other and of extracting them or a way of carrying out a morpheme analysis to extract a pair of words which are in NP—NP, subject-predicate or object-predicate relation.

At a step 201 the user inputs a retrieval request for the target document in the form of a sentence through the use of the retrieval request inputting means 107. At a step 202 the word frequency calculating means 108 refers to the word frequency index 103 to obtain the total number ND of documents and further to attain a frequency of occurrence TFij of a dictionary word Wi (i=1, 2, . . . , NW where NW corresponds to the number of dictionary words included in the retrieval request), included in the retrieval request inputted through the retrieval request inputting means 107, in a document Dj (j=1, 2, . . . , ND) and the number NDi of documents where that word appears and further outputs them to the frequency score calculating means 109.

At a step 203 the frequency score calculating means 109 calculates a frequency score SFj indicative of the degree of coincidence between the document Dj due to the word frequency and the retrieval request according to the above-mentioned equation (1) on the basis of the total number ND of documents, the number NDi of documents where the word Wi appears and the occurrence frequency TFij of the word Wi in the document Dj outputted from the word frequency calculating means 108. That is, the frequency score based on that word is added to the frequency score of the document Dj to obtain the frequency score SFj.

At a step 204 the word cooccurrence information extracting means 110 extracts a word cooccurrence relation Ck (k=1, 2, . . . , NC where NC represents the number of word cooccurrence relations included in the retrieval request) from the retrieval request inputted through the retrieval request inputting means 107 according to the same method as that taken at the index production. At a step 205 the word cooccurrence relation checking means 111 refers to the word cooccurrence index 104 to calculate the number of those of the word cooccurrence relations arising in the document Dj which coincide with the word cooccurrence relation Ck of the retrieval request the word cooccurrence information extracting means 110 provides, and further outputs the calculation result to the cooccurrence score calculating means 112.

At a step 206 the cooccurrence score calculating means 112 calculates a cooccurrence score SCj of the document Dj on the basis of the number of word cooccurrence relations which coincide with each other in the retrieval request and the document. In the case of the simplest example, the number of cooccurrences is directly used as the cooccurrence score SCj as expressed by an equation (3).

$$SCj=NCj \qquad (3)$$

At a step 207 the document score calculating means 113 calculates a document score Sj representative of the degree of coincidence between the document Dj and the retrieval request according to an equation (4) on the basis of the frequency score outputted from the frequency score calculating means 109 and the cooccurrence score outputted from the cooccurrence score calculating means 112.

$$Sj=SFj+SCj\times constant \qquad (4)$$

At a step 208 the document ranking means 114 rearranges the documents in the order of decreasing document score Sj of each document Dj outputted from the document score calculating means 113, and at a step 209 the retrieval result displaying means 115 displays to the user as the retrieval result the sorted documents given from the output of the document ranking means 114.

As described above, in addition to the word frequency, the influence on the ranking is determined by looking up the word cooccurrence relation included in the retrieval request and the target document, and therefore the document closer to the user's retrieval intention can be displayed at a more significant rank in the retrieval result and the retrieval is possible with an efficiency.

Second Embodiment

Figure 3:
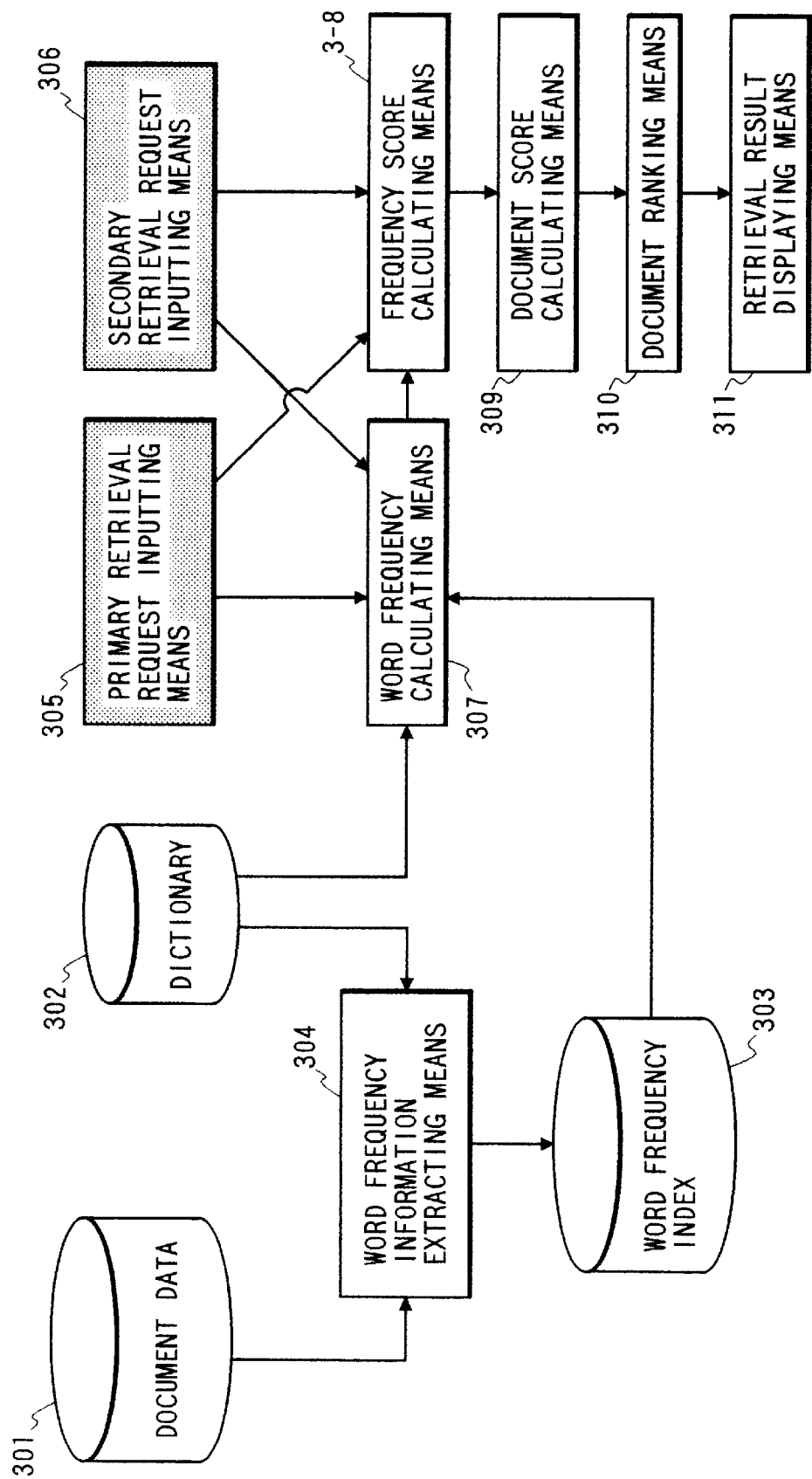
FIG. 3 is a block diagram showing an arrangement of a document retrieval system according to a second embodiment of the present invention.

FIG. 3 is a block diagram showing an arrangement of a document retrieval system according to a second embodiment of the present invention. In FIG. 3, the document retrieval system is composed of document data 301 undergoing the retrieval, a dictionary 302, a word frequency index 303 for storing a frequency of occurrence of a dictionary word in a target document, a word frequency information extracting means 304 for extracting word frequency information from the document data 301 to store it in the word frequency index 303, a primary retrieval request inputting means 305 for allowing the user to input a retrieval request the user wants to dealt with preferentially, a secondary retrieval request inputting means 306 for allowing the user to input a retrieval request having a lower precedence than that of the primary retrieval request, a word frequency calculating means 307 for consulting the word frequency index 303 to obtain a frequency of occurrence of a dictionary word, included in the retrieval requests inputted through the primary retrieval request inputting means 305 and the secondary retrieval request inputting means 306, in each document, a frequency score calculating means 308 for calculating a frequency score of each document on the basis of the word frequency obtained in the word frequency calculating means 307, a document score calculating means 309 for calculating a document score of each document on the basis of the output of the frequency score calculating means 308, a document ranking means 310 for rearranging the documents in the order of score, and a retrieval result displaying means 311 for displaying the resultant documents arranged in the order of score.

Figure 4:
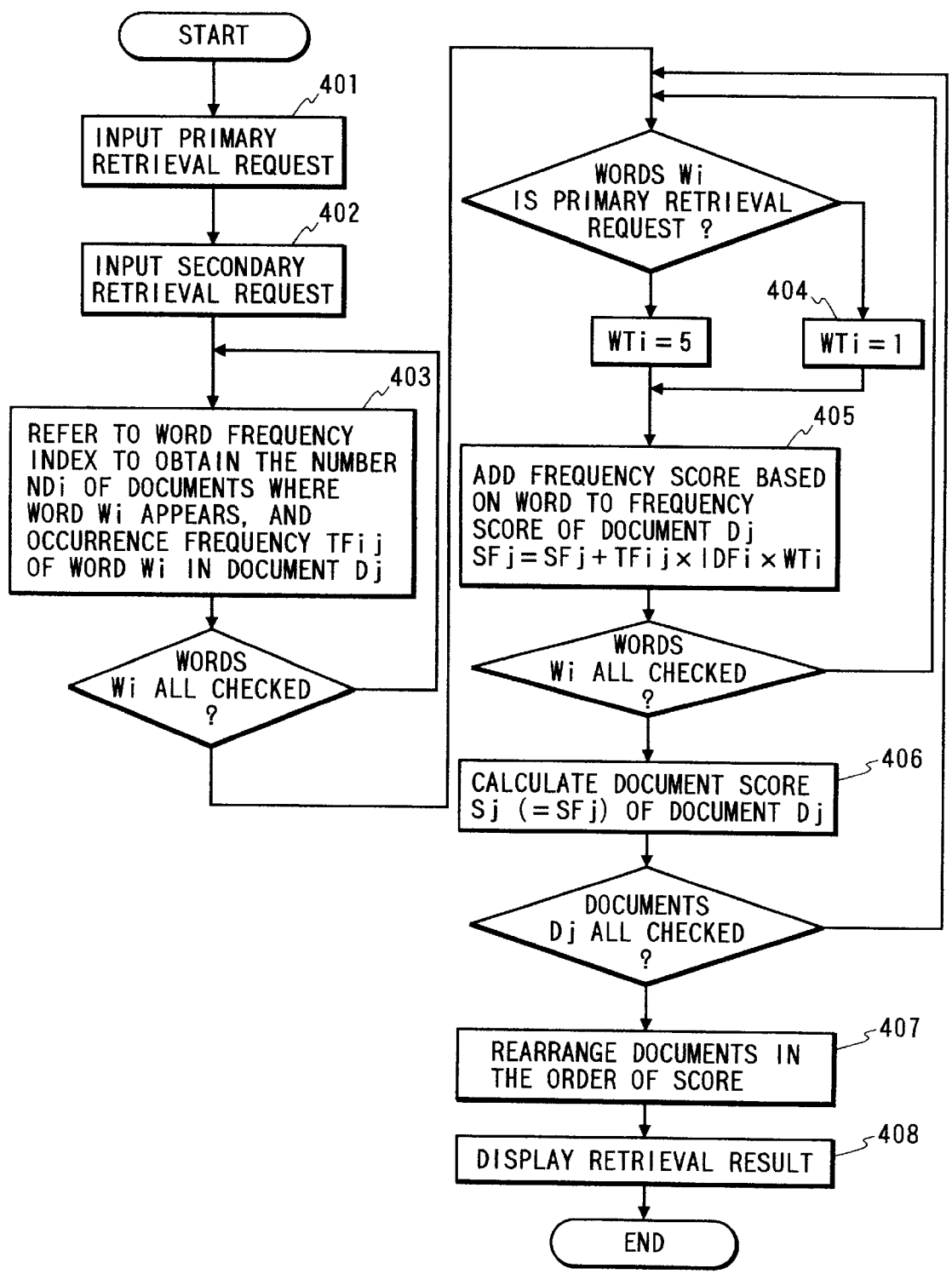
FIG. 4 is a flow chart showing a retrieval procedure of the document retrieval system according to the second embodiment of this invention.

FIG. 4 is a flow chart showing a retrieval operation of the document retrieval system according to the second embodiment of this invention.

First of all, prior to the retrieval the word frequency information extracting means 304 scans the document data 301 to find out the frequency of occurrence of a dictionary word of the dictionary 302 in each of the documents, with the frequency of occurrence together with the total number of documents and the number of documents where that word appears being outputted to the word frequency index 303 to make out an index.

At a step 401 the user inputs as a primary retrieval request a retrieval request for a document he intends to search through the use of the primary retrieval request inputting means 305, whereas at a step 402 the user inputs as a secondary retrieval request a retrieval request for a document having a relatively low importance through the use of the secondary retrieval request inputting means 306.

At a step 403 the word frequency calculating means 307 refers to the word frequency index 303 to acquire the total number ND of documents and further to attain a frequency of occurrence TFij of a dictionary word Wi (i=1, 2, ..., NW where NW corresponds to the number of dictionary words included in the retrieval request), included in the retrieval requests inputted through the primary retrieval request inputting means 305 and the secondary retrieval request inputting means 306, in a document Dj (j=1, 2, ..., ND) and the number NDi of documents where that word appears and further outputs them to the frequency score calculating means 308. At a step 404 the word frequency calculating means 307 takes a parameter WTi in accordance with whether the word Wi is included in the primary retrieval request or in the secondary retrieval request. Further, at a step 405 the frequency score calculating means 308 calculates a frequency score SFj representative of the degree of coincidence between the document Dj based upon the word frequency and the retrieval request according to the following equation (5) on the basis of the total number ND of documents, the number NDi of documents where the word Wi emerges, the frequency of occurrence TFij of the word Wi in the document Dj and the weighting parameter WTi of the word Wi the word frequency calculating means 307 outputs. That is, the frequency score based on that word is added to the frequency score of the document Dj to obtain the frequency score SFj.

$$SFj = \sum_i (TFij \times IDFi \times WTi) \qquad (5)$$

$$IDFi = 1 - \log(NDi/ND)$$

where IDFi designates a parameter representative of a bias of the word Wi in all the documents.

At a step 406 the document score calculating means 309 calculates a document score Sj indicative of the degree of coincidence between the document Dj and the retrieval request according to the above-mentioned equation (2) as a function of the frequency score outputted from the frequency score calculating means 308. At a step 407 the document ranking means 310 rearranges the documents in the order of decreasing document score Sj of each document Dj from the document score calculating means 309, and a step 407 the retrieval result displaying means 311 displays as a retrieval result to the user the sorted documents obtained from the output of the document ranking means 310.

As described above, a precedence is given to each the retrieval request the user inputs, and therefore it is possible to flexibly express the user's retrieval intention and further to accomplish the effective retrieval.

Third Embodiment

Figure 5:
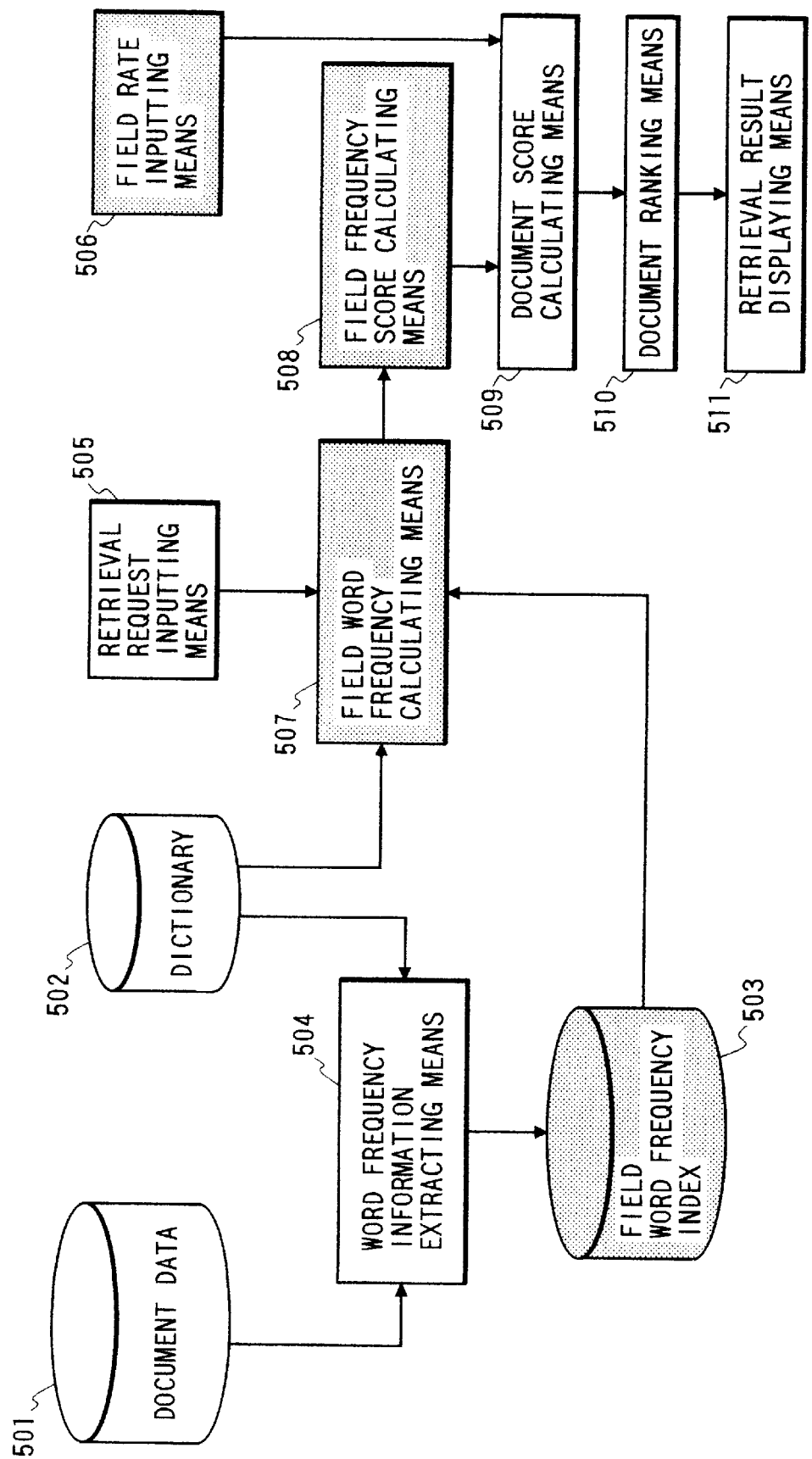
FIG. 5 is a block diagram showing an arrangement of a document retrieval system according to a third embodiment of the present invention.

FIG. 5 is a block diagram showing an arrangement of a document retrieval system according to a third embodiment of the present invention. In FIG. 5, the document retrieval system comprises document data 501 being the object of retrieval, a dictionary 502, a field word frequency index 503 for storing a frequency of occurrence of a dictionary word in a target document at every field, a word frequency information extracting means 504 for extracting word frequency information from the document data 501 and for putting it in the field word frequency index 503, a retrieval request inputting means 505 for allowing the user to input a retrieval request, a field rate inputting means 506 for allowing the user to input a rate indicative of the degree of the influence of a score of some field of a document on a document score, a field word frequency calculating means 507 for consulting the field word frequency index 503 in terms of a dictionary word included in the retrieval request inputted through the retrieval request inputting means 505 to obtain a frequency of occurrence of it in each document, a field frequency score calculating means 508 for calculating a frequency score at every field of each document on the basis of the word frequency acquired in the field word frequency calculating means 507, a document score calculating means 509 for calculating a document score of each document on the basis of the output of the field frequency score calculating means 508 and the input to the field rate inputting means 506, a document ranking means 510 for rearranging the documents in the order of score, and a retrieval result displaying means 511 for displaying the resultant documents arranged in the order of score.

Figure 6:
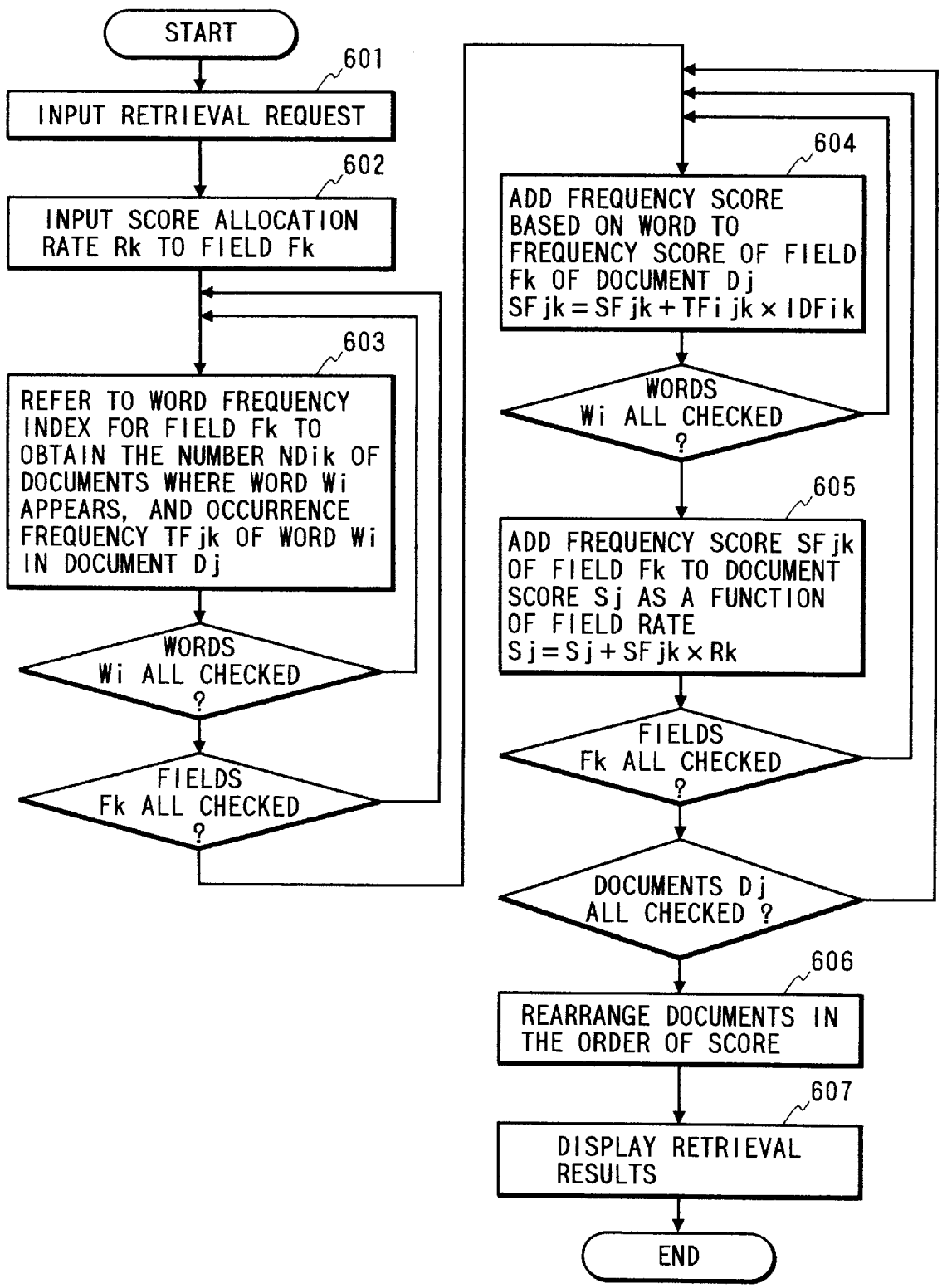
FIG. 6 is a flow chart showing a retrieval procedure of the document retrieval system according to the third embodiment of this invention.

FIG. 6 is a flow chart showing a retrieval operation of the document retrieval system according to the third embodiment of this invention. Previous to the retrieval the word frequency information extracting means 504 scans the document data 501 to look up the frequency of occurrence of a dictionary word included in the dictionary 502 in each of the documents and outputs it together with the total number of documents and the number of documents where that word emerges to the field word frequency index 503 where an index is made out in advance.

At a step 601, through the retrieval request inputting means 505 the user inputs a retrieval request the user wants. At a step 602, through the field rate inputting means 506 the user inputs an rate Rk of the influence of a score of a field Fk (k=1, 2, . . . , NF where NF designates the total number of fields) on the ranking.

At a step 603 the field word frequency calculating means 507 refers to the field word frequency index 503 to obtain the total number ND of documents and further to attain a frequency of occurrence TFijk of a dictionary word Wi (i=1, 2, . . . , NW where NW corresponds to the number of dictionary words included in the retrieval request), included in the retrieval request inputted through the retrieval request inputting means 505, in a field Fk of a document Dj (j=1, 2, . . . , ND) and the number NDik of documents where that word appears in the field Fk and further outputs them to the field frequency score calculating means 508.

At a step 604 the field frequency score calculating means 508 calculates a frequency score SFjk representative of the degree of coincidence between the field Fk of the document Dj based upon the word frequency and the retrieval request according to the following equation (6) on the basis of the total number ND of documents, the number NDik of documents where the word Wi appears in the field Fk and the occurrence frequency TFijk of the word Wi in the field Fk of the document Dj outputted from the field word frequency calculating means 507. That is, the frequency score based on that word is added to the frequency score of the field Fk of the document Dj to obtain the frequency score SFjk.

$$SFjk = \sum_i (TFijk \times IDFik) \qquad (6)$$

$$IDFik = 1 - \log(NDik / ND)$$

At a step 605 the document score calculating means 509 calculates a document score Sj indicative of the degree of coincidence between the document Dj and the retrieval request according to the following equation (7) on the basis of the frequency score of each field outputted from the field frequency score calculating means 508 and the rate Rk of the influence of the field Fk inputted to the score field rate inputting means 506. That is, the addition calculation of the frequency score SFjk of the field Fk of the document Dj to the document score Sj is made as a function of the field rate Rk.

$$Sj = \sum_k (SFjk \times Rk) \qquad (7)$$

At a step 606, the document ranking means 510 rearranges the documents in the order of decreasing document score Sj of each document Dj outputted from the document score calculating means 509, and at a step 607 the retrieval result displaying means 511 displays to the user as a retrieval result the sorted documents given from the output of the document ranking means 510.

As described above, the user can change the rate of the score allocation of the retrieval field, and hence it is possible to flexibly express the user's retrieval intention and further to achieve the effective retrieval.

Fourth Embodiment

Figure 7:
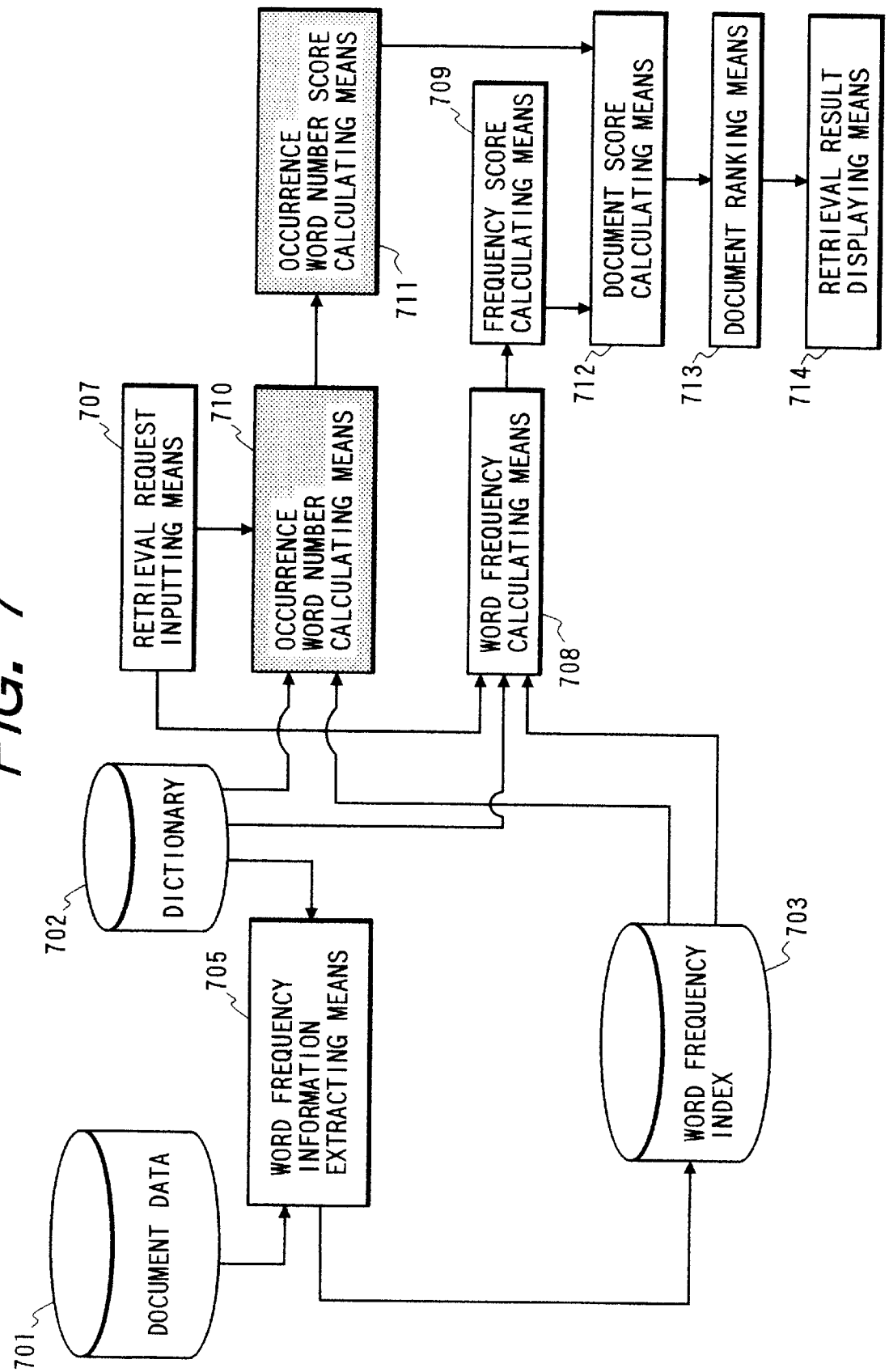
FIG. 7 is a block diagram showing an arrangement of a document retrieval system according to a fourth embodiment of the present invention.

FIG. 7 is a block diagram showing an arrangement of a document retrieval system according to a fourth embodiment of the present invention. In FIG. 7, the document retrieval system comprises document data 701 being the object of retrieval, a dictionary 702, a word frequency index 703 for retaining a frequency of occurrence of a dictionary word in a target document, a word frequency information extracting means 705 for deriving word frequency information from the document data 701 and further for storing it in the word frequency index 703, a retrieval request inputting means 707 through which the user inputs a retrieval request, a word frequency calculating means 708 for consulting the word frequency index 703 to calculate a frequency of occurrence of a dictionary word, included in the retrieval request inputted through the retrieval request inputting means 707, in a document, a frequency score calculating means 709 for calculating a score of each document on the basis of the word frequency attained in the word frequency calculating means 708, an occurrence word number calculating means 710 for consulting the word frequency index 703 to find out how many words of words included in the retrieval request inputted through the retrieval request inputting means 707 appear in the document, an occurrence word number score calculating means 711 for obtaining a score to be added to each document on the basis of the number of occurrence words attained in the occurrence word number calculating means 710, a document score calculating means 712 for calculating a document score of each document on the basis of the outputs of the frequency score calculating means 709 and the occurrence word number score calculating means 711, a document ranking means 713 for rearranging the documents in the order of score, and a retrieval result displaying means 714 for displaying the resultant documents arranged in the order of score.

Figure 8:
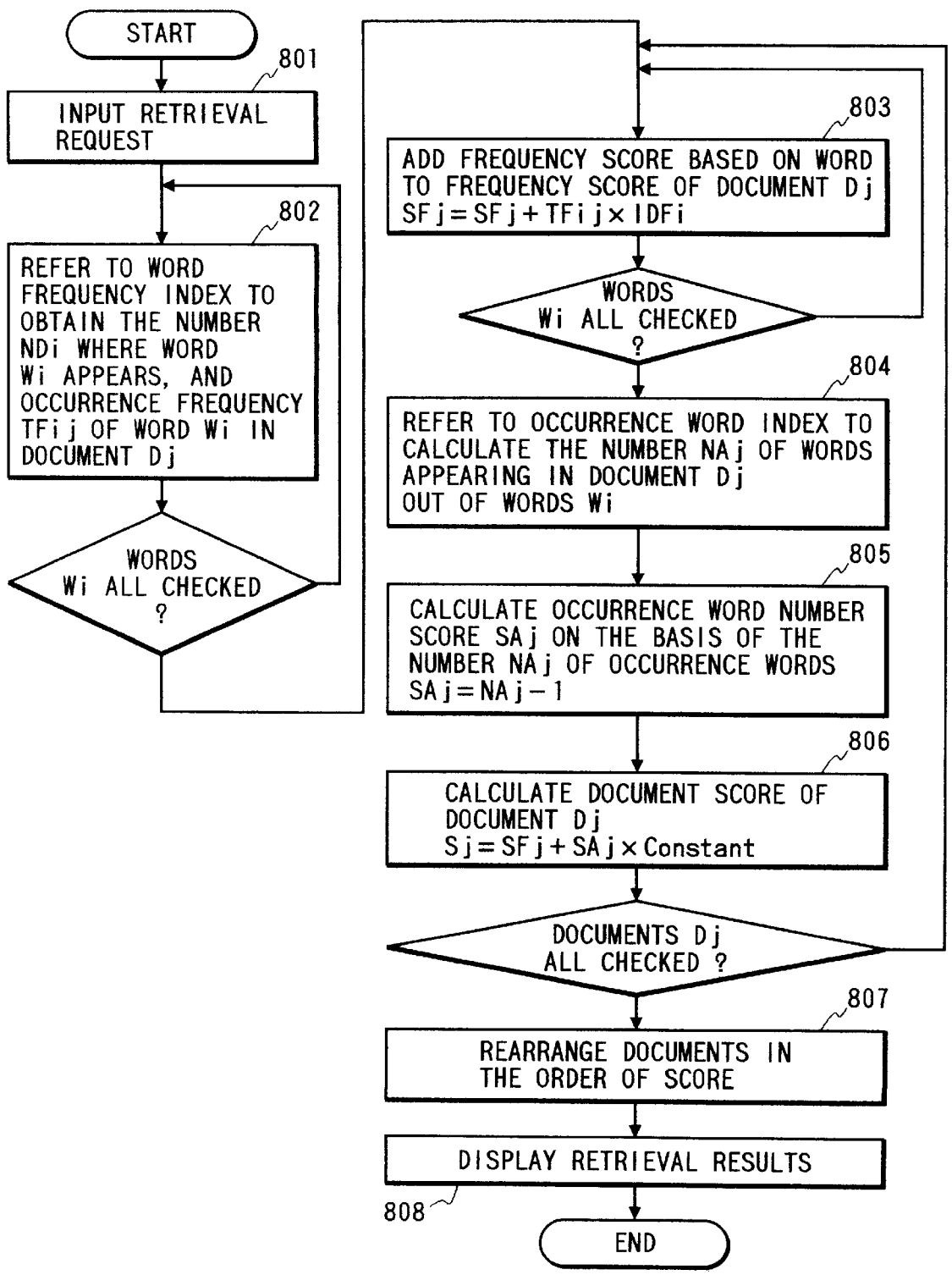
FIG. 8 is a flow chart showing a retrieval procedure of the document retrieval system according to the fourth embodiment of this invention.

FIG. 8 is a flow chart showing a retrieval operation of the document retrieval system according to the fourth embodiment of this invention. Before the retrieval the word frequency information extracting means 705 scans the document data 701 to discover a frequency of occurrence a dictionary word included in the dictionary 702 in each document and further outputs the frequency of occurrence together with the total number of documents and the number of documents where that word appears to the word frequency index 703 to make out an index.

At a step 801, through the retrieval request inputting means 707 the user inputs a retrieval request for a document the user searches. It is appropriate to input a plurality of words as the retrieval request or input a sentence and to derive words from the sentence through the additional use of a word extracting means.

At a step 802 the word frequency calculating means 708 refers to the word frequency index 703 to obtain the total number N of documents and further to attain frequencies of occurrence TFij of a plurality of dictionary words Wi (i=1, 2, . . . , NW where NW corresponds to the number of dictionary words included in the retrieval request), included in the retrieval request inputted through the retrieval request inputting means 707, in a document Dj (j=1, 2, . . . , ND) and the number NDi of documents where the words Wi appear and further outputs them to the frequency score calculating means 709.

At a step 803 the frequency score calculating means 709 calculates a frequency score SFj indicative of the degree of coincidence between the document Dj due to the word frequency and the retrieval request according to the above-mentioned equation (1) on the basis of the total number ND of documents, the number NDi of documents where the word Wi appears and the occurrence frequency TFij of the word Wi in the document Dj. That is, the frequency score based on that word is added to the frequency score of the document Dj to obtain the frequency score SFj.

At a step 804 the occurrence word number calculating means 710 compares information of the dictionary words appearing in the document Dj already obtained before the step 802 with a plurality of words Wi included in the retrieval request inputted through the retrieval request inputting means 707, with the number NAj of words appearing in the document Dj out of the plurality of words Wi being calculated and outputted to the occurrence word number score calculating means 711.

At a step 805 the occurrence word number score calculating means 711 calculates an occurrence word number score SAj on the basis of, of the words included in the retrieval request outputted from the occurrence word number calculating means 710, the number NAj of words occurring in the document Dj, for example, according to the following equation (8).

$$SAj = NAj - 1 \quad (8)$$

At a step 806, the document score calculating means 712 calculates a score Sj indicative of the degree of the coincidence between the retrieval request and the document Dj according to the following equation (9) on the basis of the frequency score SFj the frequency score calculating means 709 outputs and the occurrence word number score SAj the occurrence word number score calculating means 711 outputs.

$$Sj = SFj + SAj \times constant \quad (9)$$

The preparation of the occurrence word score SAj can increase the score of the document more including the words the retrieval request has, so that the preferential display thereof is practicable. In addition, the degree of the preferential display based upon the number of the occurrence words becomes variable in a manner that the value of the constant changes in the equation (9).

At a step 807 the document ranking means 713 rearranges the documents Dj in the order of decreasing document score Sj outputted from the document score calculating means 712. Further, step 808 the retrieval result display means 714 shows as a retrieval result to the user the sorted documents obtained from the output of the document ranking means 713.

As described above, in cases where the retrieval request includes a plurality of words, it is avoidable that a document which includes only one high-frequency word is ranked high in the retrieval result, which enables the effective retrieval.

Fifth Embodiment

Figure 9:
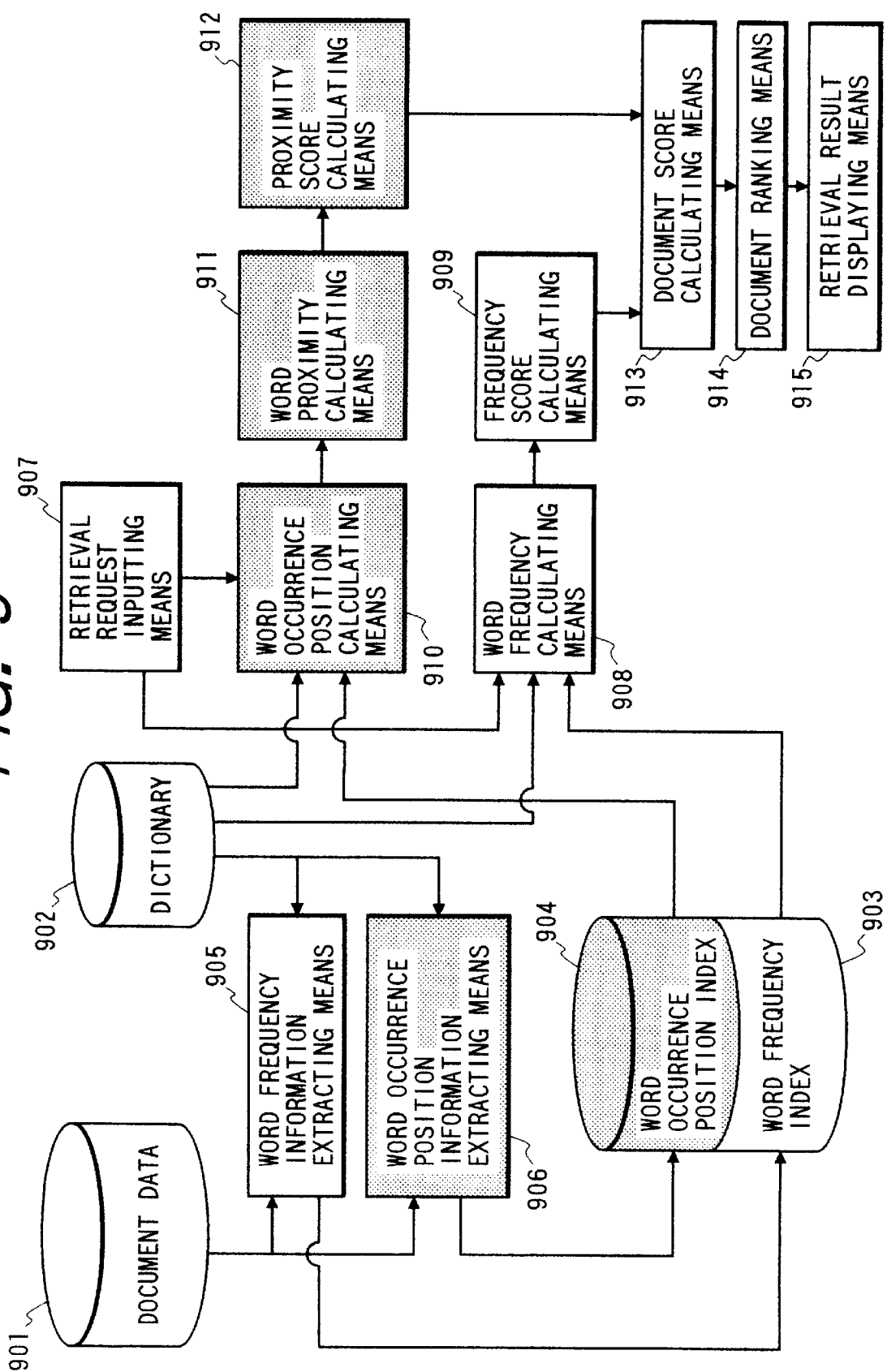
FIG. 9 is a block diagram showing an arrangement of a document retrieval system according to a fifth embodiment of the present invention.

FIG. 9 is a block diagram showing an arrangement of a document retrieval system according to a fifth embodiment of the present invention. In FIG. 9, the document retrieval system document data 901 being the object of retrieval, a dictionary 902, a word frequency index 903 for storing a frequency of occurrence of a dictionary word in a target document, a word occurrence position index 904 for storing a position of a word appearing in the target document, a word frequency information extracting means 905 for extracting word frequency information from the document data 901 and further for storing it in the word frequency index 903, a word occurrence position information extracting means 906 for acquiring word position information from the document data 901 and further for retaining it in the word occurrence position index 904, a retrieval request inputting means 907 through which the user inputs a retrieval request, a word frequency calculating means 908 for consulting the word frequency index 903 to calculate an occurrence frequency of a dictionary word, included in the retrieval request inputted through the retrieval request inputting means 907, in a document, a frequency score calculating means 909 for obtaining a score of each document on the basis of the word frequency attained in the word frequency calculating means 908, an occurrence position calculating means 910 for referring to the word occurrence position index 904 to obtain an occurrence position of a word, included in the retrieval request inputted through the retrieval request inputting means 907, in the document, a word proximity calculating means 911 for calculating the degree of proximity between words on the basis of the output of the word occurrence position calculating means 910, a proximity score calculating means 912 for attaining a score to be added to each document, on the basis of the output of the word proximity calculating means 911, a document score calculating means 913 for calculating a score of each document on the basis of the outputs of the frequency score calculating means 909 and the proximity score calculating means 912, a document ranking means 914 for rearranging the documents in the order of score, and a retrieval result displaying means 915 for displaying the resultant documents arranged in the order of score.

Figure 10:
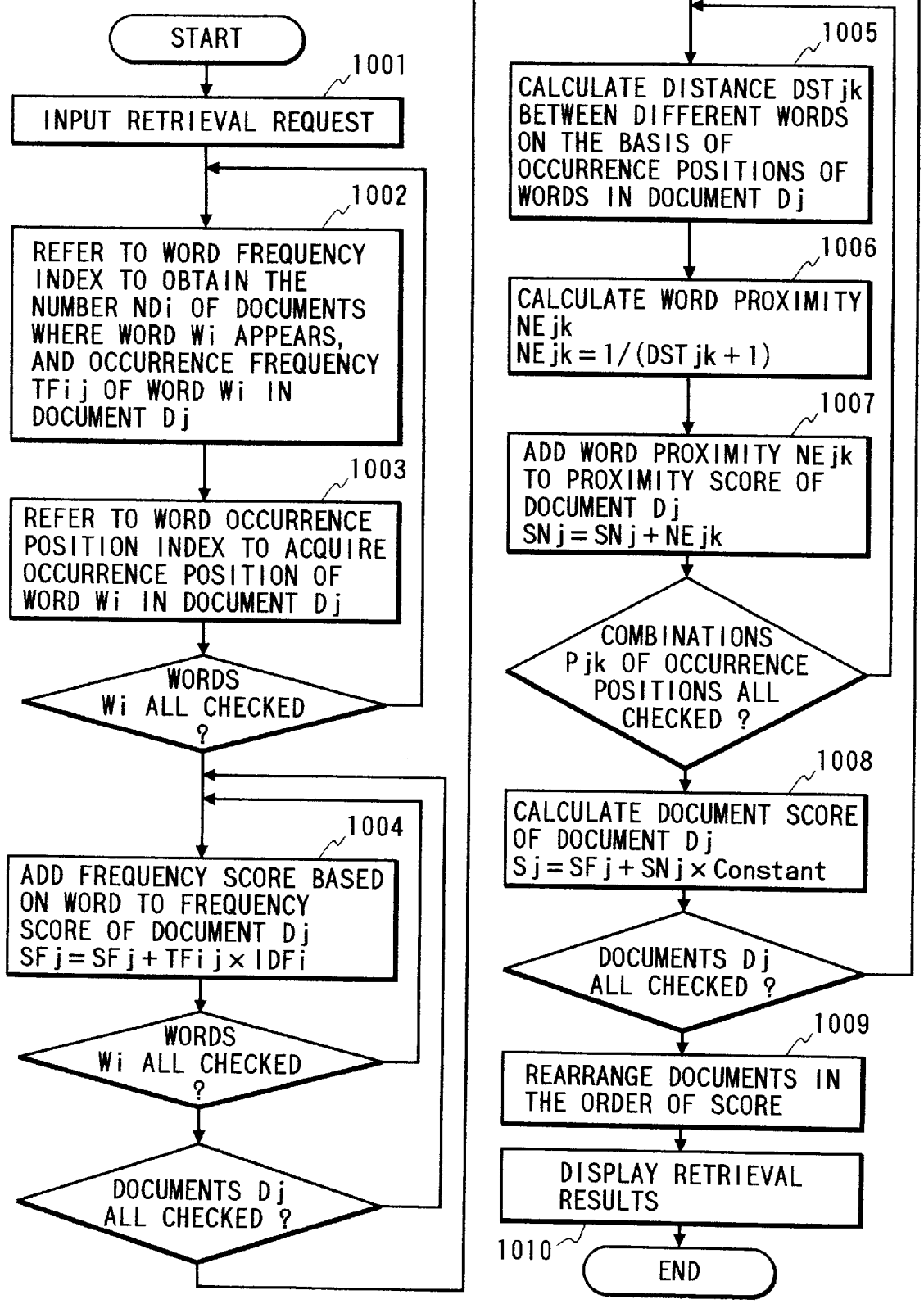
FIG. 10 is a flow chart showing a retrieval procedure of the document retrieval system according to the fifth embodiment of this invention.

FIG. 10 is a flow chart showing a retrieval operation of the fifth embodiment of this invention. Before the retrieval, the word frequency information extracting means 905 scans the document data 901 to look up a frequency of occurrence of a dictionary word of the dictionary 902 in each document to output it together with the total number of documents and the number of documents where that word takes place to the word frequency index 903, whereas the word occurrence position information extracting means 906 discovers the occurrence position of the dictionary word in each document to output it to the word occurrence position index 904 so that an index is made out.

At a step 1001, through the retrieval request inputting means 907 the user inputs a plurality of words as a retrieval request for the target document. It is also appropriate that the user inputs a sentence as the retrieval request and to derive words from the sentence through the use of an additionally provided word extracting means.

At a step 1002 the word frequency calculating means 908 refers to the word frequency index 903 to find out the total number ND of documents and further to know a frequency of occurrence TFij of a dictionary word Wi (i=1, 2, . . . , NW where NW corresponds to the number of dictionary words included in the retrieval request), included in the retrieval request inputted through the retrieval request inputting means 907, in a document Dj (j=1, 2, . . . , ND) and the number NDi of documents where that words Wi appear and further outputs them to the frequency score calculating means 909.

At a step 1003 the word occurrence position calculating means 910 refers to the word occurrence position index 904 to acquire all the occurrence positions of the plurality of words Wi, inputted through the retrieval request inputting means 907, in the document Dj to output them to the word proximity calculating means 911. At a step 1004 the frequency score calculating means 909 calculates a frequency score SFj indicative of the degree of coincidence between the document Dj based upon the word frequency and the retrieval request according to the above-mentioned equation (1) on the basis of the total number ND of documents, the number NDi of documents where the words Wi appear, and the occurrence frequency TFij of the words Wi in the document Dj. That is, the frequency score based on that word is added to the frequency score of the document Dj, thus calculating the frequency score SFj.

At a step 1005 the word proximity calculating means 911 calculates a distance DSTjk between two words in terms of combinations Pk (k=1, 2, . . . , NP where NP represents the number of combinations of all the occurrence positions of different words) of all the occurrence positions of different words on the basis of the occurrence position of each word Wi in the document Dj outputted from the word occurrence position calculating means 910 and the word length thereof, and at a step 1006 it calculates a word proximity NEjk from the DSTjk. For example, the word proximity NEjk can be given by the following equation (9).

$$NEjk = 1/(DSTjk+1) \quad (10)$$

Incidentally, since obtaining the degree of the word proximity of all the combinations requires a large calculation cost, it is possible that a threshold d is set so that the calculation is made only for the combinations of the occurrence positions which have a distance DSTjk below d or that the user limits the word pairs undergoing the calculation of the proximity.

At a step 1007 the proximity score calculating means 912 calculates a proximity score SNj of each document Dj according to the following equation (11) as a function of the word proximity NEjk being the output of the word proximity calculating means 911. More specifically, the word proximity NEjk calculated is added to the proximity score of the document Dj, thereby attaining the proximity score SNj.

$$SNj = \sum_k (NEjk) \quad (11)$$

At a step 1008 the document score calculating means 913 calculates a score Sj, i.e., the degree of coincidence between the retrieval request and the document Dj according to the following equation (12) on the basis of the frequency score SFj being the output of the frequency score calculating means 909 and the proximity score SNj being the output of the proximity score calculating means 912.

$$Sj = SFj + SNj \times constant \quad (12)$$

Thus, the preparation for the proximity score SNj can raise the score of the document where different words included in the retrieval request appear in close relation to each other and further allows the preferential display. In addition, the change of the value of the constant in the above-mentioned equation (12) permits of the variation of the preferential display based upon the word proximity degree.

At a step 1009 the document ranking means 914 rearranges the documents in the order of decreasing document score of each document Dj outputted from the document score calculating means 913. Further, at a step 1010 the retrieval result displaying means 915 shows as the retrieval result to the user the sorted documents obtained from the output of the document ranking means 914.

With the above-described arrangement, in cases where it is no use making the retrieval request unless a plurality of words included in the retrieval request occur in close relation to each other, impropriety that unnecessary documents assume a higher rank is avoidable, thus accomplishing the effective retrieval.

Sixth Embodiment

Figure 11:
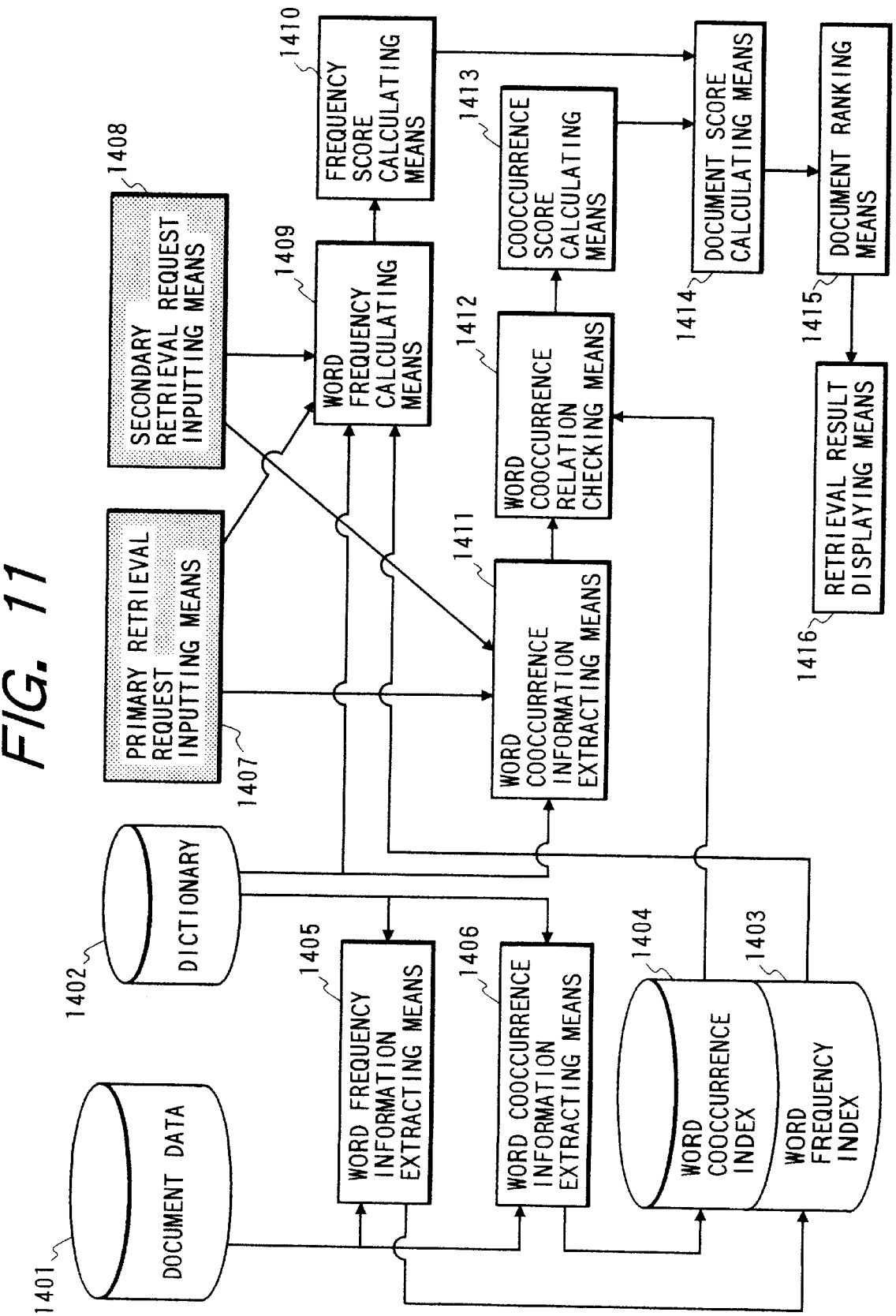
FIG. 11 is a block diagram showing an arrangement of a document retrieval system according to a sixth embodiment of the present invention.
Figure 12:
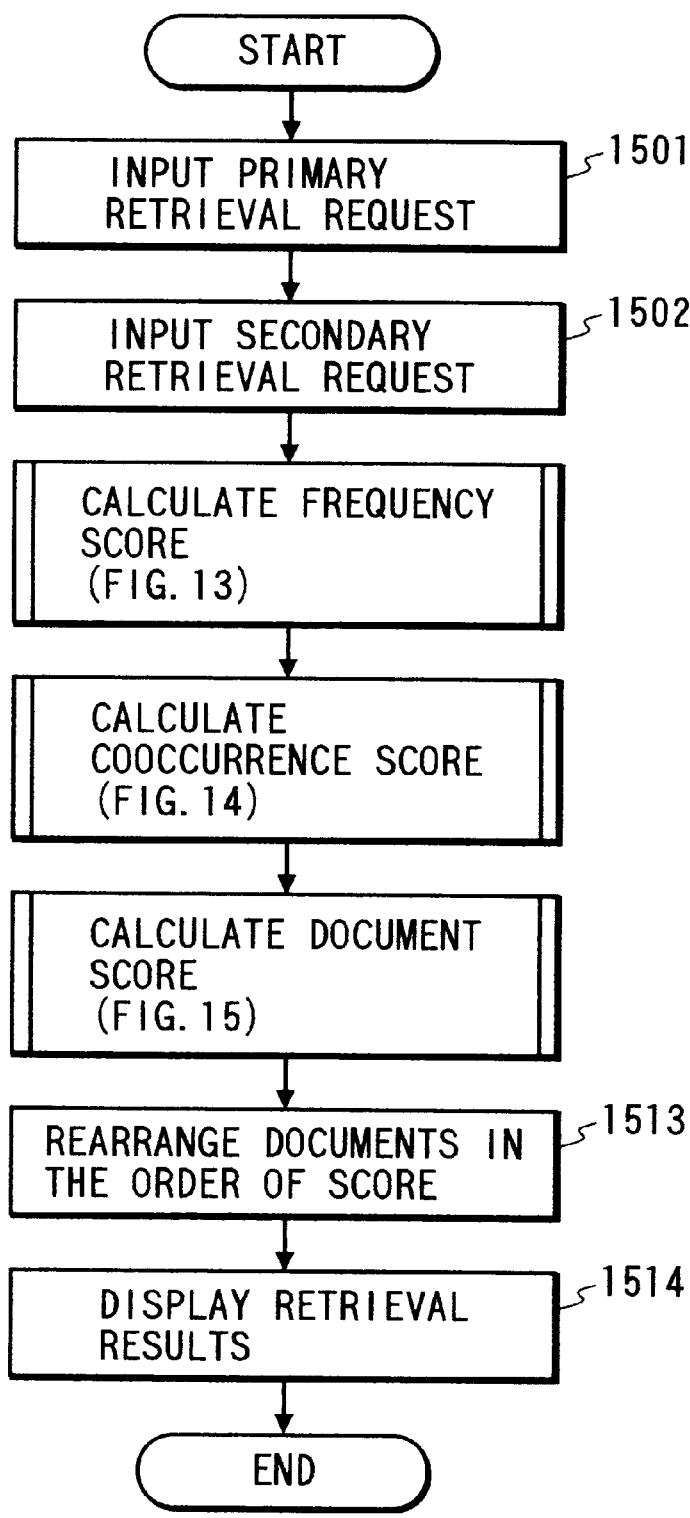
FIG. 12 is a flow chart showing a retrieval procedure of the document retrieval system according to the sixth embodiment of this invention.
Figure 13:
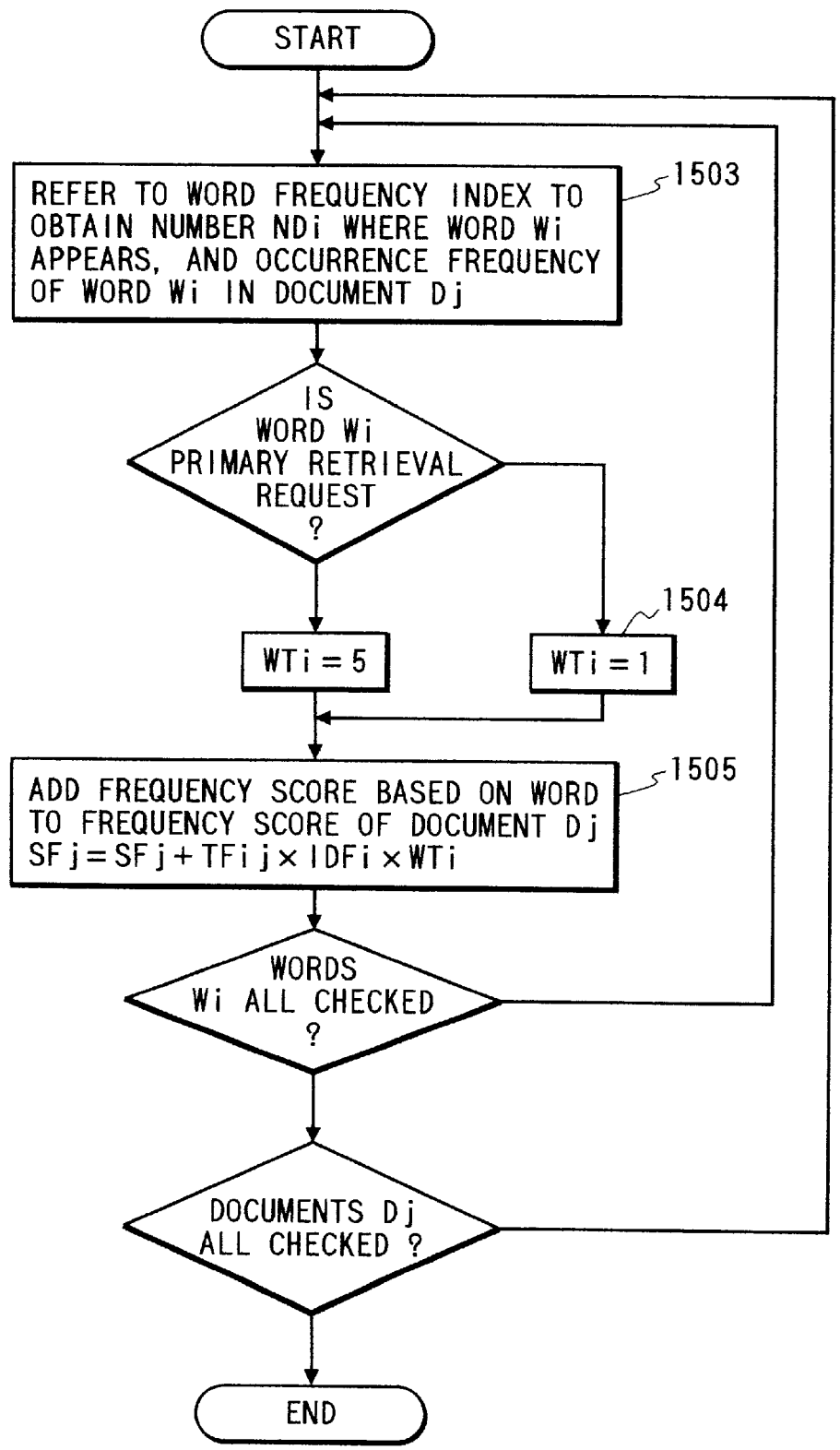
FIG. 13 is a flow chart showing a retrieval procedure of the document retrieval system according to the sixth embodiment of this invention.
Figure 14:
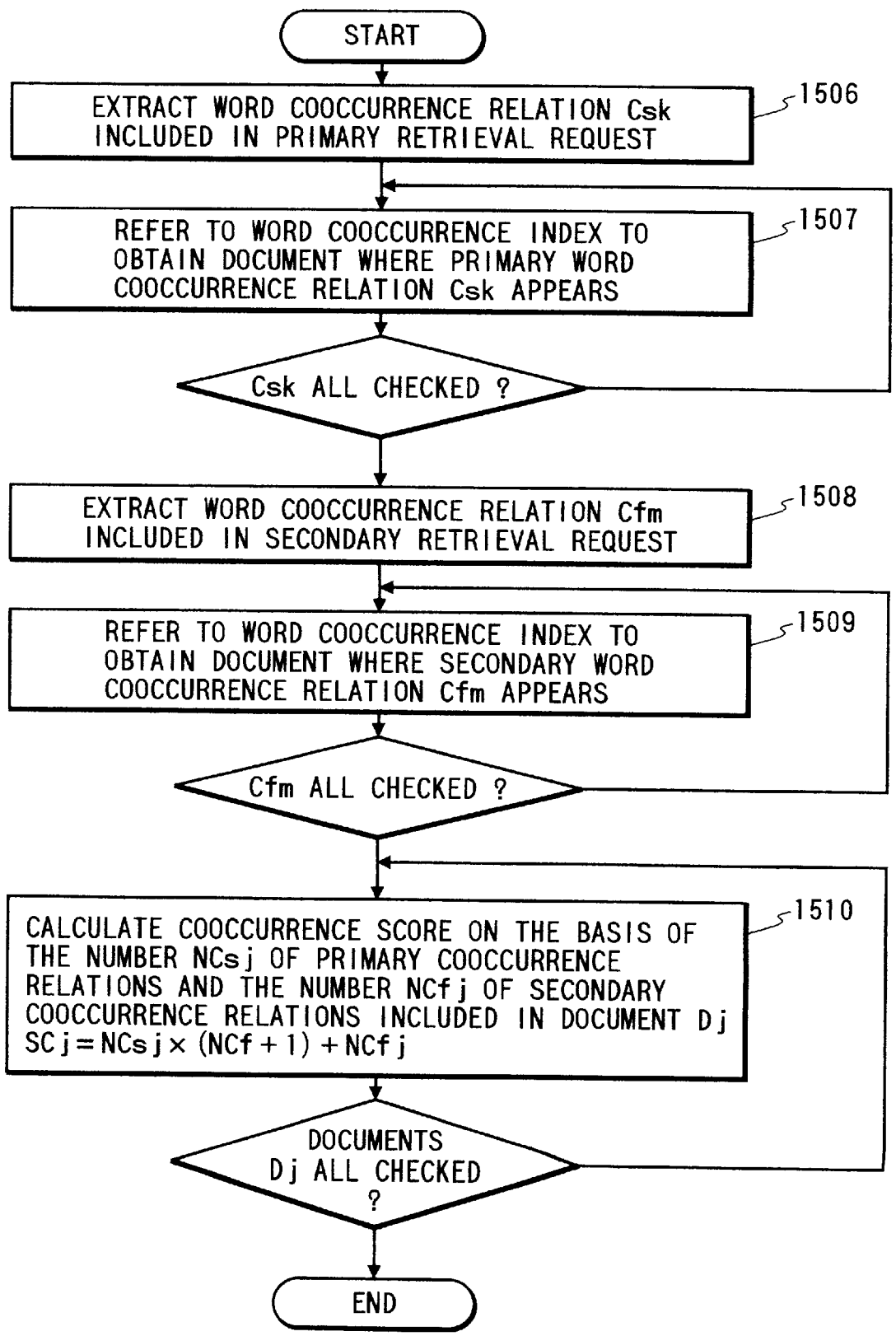
FIG. 14 is a flow chart showing a retrieval procedure of the document retrieval system according to the sixth embodiment of this invention.
Figure 15:
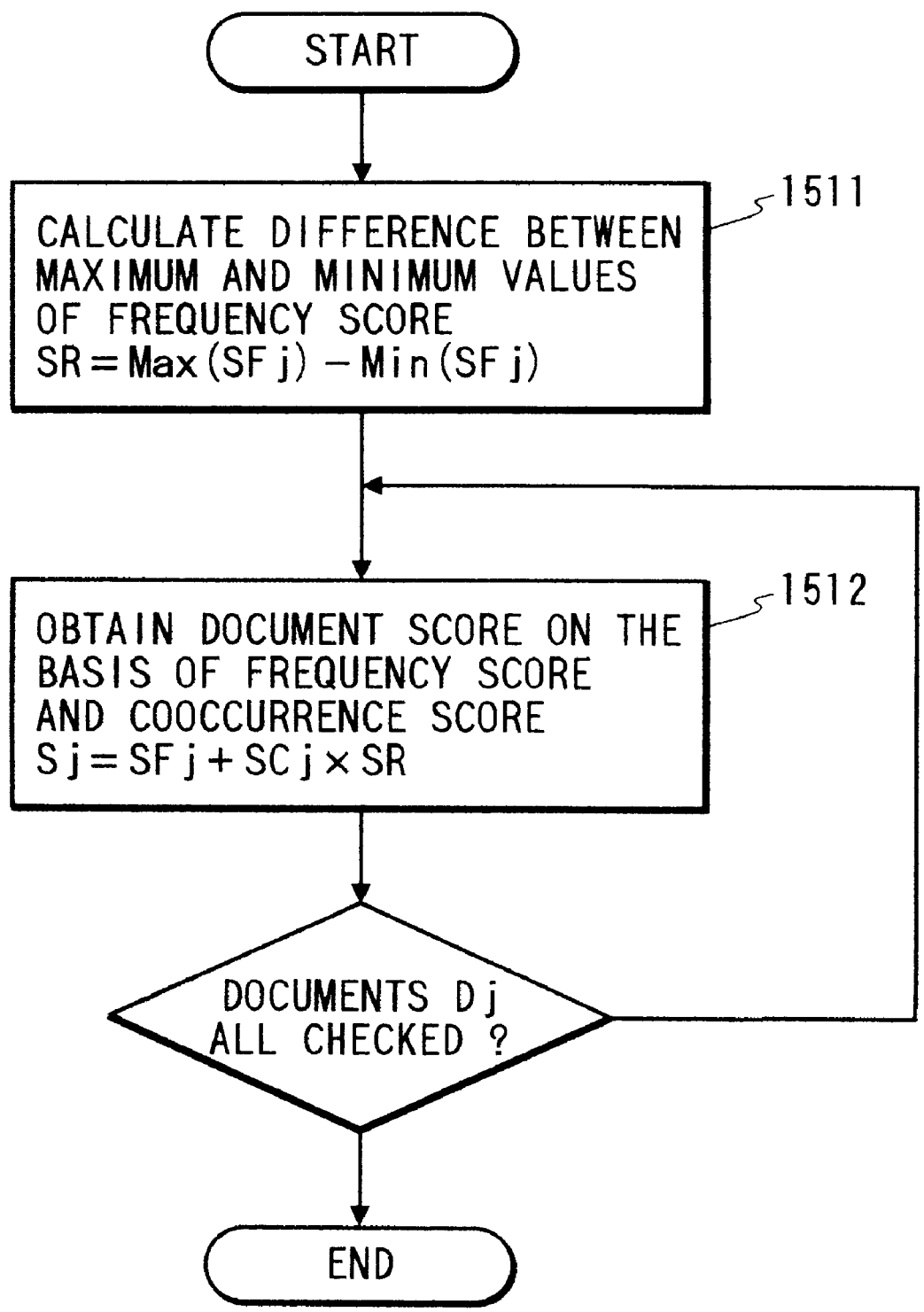
FIG. 15 is a flow chart showing a retrieval procedure of the document retrieval system according to the sixth embodiment of this invention.

FIG. 11 is a block diagram showing an arrangement of a document retrieval system according to a sixth embodiment of the present invention. In FIG. 11, the document retrieval system is composed of document data 1401 being an object of the retrieval, a dictionary 1402, a word frequency index 1403 for storing a frequency of occurrence of a dictionary word in a target document, a word cooccurrence index 1404 for storing word cooccurrence information appearing in the target document, a word frequency information extracting means 1405 for extracting word frequency information from the document data 1401 and further for putting it in the word frequency index 1403, a word cooccurrence information extracting means 1406 for extracting word cooccurrence information from the document data 1401 and further for putting it in the word cooccurrence index 1404, a primary retrieval request inputting means 1407 for allowing the user to input a retrieval request the user attaches importance to, a secondary retrieval request inputting means 1408 for allowing the user to input a retrieval request the user attaches lower importance to as compared with the primary retrieval request, a word frequency calculating means 1409 for consulting the word frequency index 1403 to attain a frequency of occurrence of dictionary words, included in the retrieval requests inputted through the primary retrieval request inputting means 1407 and the secondary retrieval request inputting means 1408, in a document, a frequency score calculating means 1410 for calculating a frequency score of each document on the basis of the word occurrence frequency attained in the word frequency calculating means 1409, a word cooccurrence information extracting means 1411 for extracting word cooccurrence information from the retrieval requests inputted through the primary retrieval request inputting means 1407 and the secondary retrieval request inputting means 1408, a word cooccurrence relation checking means 1412 for referring to the contents of the word cooccurrence index 1404 to obtain the number of word cooccurrence relations included in the retrieval request outputted from the word cooccurrence information extracting means 1411 and appearing in each document, a cooccurrence score calculating means 1413 for obtaining a cooccurrence score of each document on the basis of the number of word cooccurrence relations attained by the word cooccurrence relation checking means 1412 and appearing in common in the retrieval request and the document, a document score calculating means 1414 for calculating the final score for each document on the basis of the output of the frequency score calculating means 1410 and the output of the cooccurrence score calculating means 1413, a document ranking means 1415 for rearranging documents in the order of score, and a retrieval result displaying means 1416 for displaying the resultant documents arranged in the order of score.

FIGS. 12 to 15 are flow charts showing a retrieval procedure in the document retrieval system according to the sixth embodiment of this invention. Prior to the retrieval, the word frequency information extracting means 1405 scans the document data 1401 to look up a frequency of occurrence of a dictionary word included in the dictionary 1402 in each document and outputs the occurrence frequency together with the total number of documents, the number of documents where that word appears to the word frequency index 1403, while the word cooccurrence information extracting means 1406 scans the document data 1401 to get word cooccurrence information in each document and outputs it to the word cooccurrence index 1404, thereby making an index out in advance. As a method of attaining the word cooccurrence information, for example there is a way of deciding that a pair of words appearing in the same sentence are in a cooccurrence relation to each other and of extracting them or a way of carrying out a morpheme analysis to extract a pair of words which are in NP—NP, subject-predicate or object-predicate relation.

At a step 1501 the user uses the primary retrieval request inputting means 1407 to input a primary retrieval request for a document the user wants to search, and to which the user attaches importance. In addition, at a step 1502 the user uses the secondary retrieval request inputting means 1408 to input a secondary retrieval request to which the user attaches less importance as compared with the primary retrieval request.

At a step 1503 the word frequency calculating means 1409 refers to the word frequency index 1403 to obtain the total number ND of documents and further to attain a frequency of occurrence TFij of a dictionary word Wi (i=1, 2, . . . , NW where NW corresponds to the number of dictionary words included in the retrieval request), included in the retrieval requests inputted through the primary retrieval request inputting means 1407 and the secondary retrieval request inputting means 1408, in a document Dj (j=1, 2, . . . , ND) and the number NDi of documents where that word appears. At a step 1504 the word frequency calculating means 1409 selects a weighting parameter WTi on the basis of whether the word Wi is included in the primary retrieval request or in the secondary retrieval request and further outputs it to the frequency score calculating means 1410.

At a step 1505 the frequency score calculating means 1410 calculates a frequency score SFj indicative of the degree of coincidence between the document Dj based upon the word frequency and the retrieval request according to the above-mentioned equation (5) on the basis of the total number ND of documents, the number NDi of documents where the word Wi appears, the occurrence frequency TFij of the word Wi in the document Dj, and the weighting parameter WTi for the word Wi the word frequency calculating means 1409 gives thereto and outputs the frequency score SFj to the document score calculating means 1414. That is, the frequency score due to that word is added to the frequency score of the document Dj.

At a step 1506 the word cooccurrence information extracting means 1411 extracts a primary cooccurrence relation Csk (k=1, 2, . . . , NCs where NCs denotes the number of word cooccurrence relations included in the primary retrieval request) from the primary retrieval request inputted through the primary retrieval request inputting means 1407 according to the same way as the index production, and outputs the extracted primary cooccurrence relation Csk to the word cooccurrence relation checking means 1412.

At a step 1507 the word cooccurrence relation checking means 1412 refers to the word cooccurrence index 1404 to calculate the number NCsj of word cooccurrence relations of the word cooccurrence relations appearing in the document Dj which coincide with the primary cooccurrence relation Csk attained in the word cooccurrence information extracting means 1411, and outputs the resultant NCsj to the cooccurrence score calculating means 1413.

At a step 1508 the word cooccurrence information extracting means 1411 extracts a secondary cooccurrence relation Cfm (m=1, 2, . . . , NCf where NCf denotes the number of word cooccurrence relations included in the secondary retrieval request) from the secondary retrieval request inputted through the secondary retrieval request inputting means 1408 according to the same method as the index production, and outputs the secondary cooccurrence relation Cfm to the word cooccurrence relation checking means 1412.

At a step 1509 the word cooccurrence relation checking means 1412 refers to the word cooccurrence index 1404 to calculate the number NCfj of word cooccurrence relations of the word cooccurrence relations appearing in the document Dj which is coincident with the secondary cooccurrence relation Cfm obtained by the word cooccurrence information extracting means 1411, and outputs the calculated NCfj to the cooccurrence score calculating means 1413.

At a step 1510 the cooccurrence score calculating means 1413 calculates a cooccurrence SCj of the document Dj according to the following equation (13) and outputs it to the document score calculating means 1414.

$$SCj = NCsj \times (NCf+1) + NCfj \qquad (13)$$

At a step 1511 the document score calculating means 1414 calculates a difference SR between the maximum and minimum values of the frequency score according to the following equation (14).

$$SR = \text{Max}(SFj) - \text{Min}(SFj) \qquad (14)$$

At a step 1512 the document score calculating means 1414 calculates a document score Sj representative of the degree of coincidence between the document Dj and the retrieval request according to the following equation (15) on the basis of the frequency score outputted from the frequency score calculating means 1410 and the cooccurrence score outputted from the cooccurrence score calculating means 1413.

$$Sj = SFj + SCj \times SR \qquad (15)$$

At a step 1513 the document ranking means 1415 rearranges the documents in the order to decreasing value of the document score Sj of each document Dj outputted from the document score calculating means 1414, and a step 1514 the retrieval result displaying means 1416 displays as the retrieval result to the user the sorted documents obtained from the output of the document ranking means 1415.

As described above, this system receives the primary retrieval request and the secondary retrieval request which differ in importance from each other and, as the criterion for the decision of the degree of coincidence between the retrieval request and the document, makes the precedence in the order of primary cooccurrence relation>secondary cooccurrence relation>primary word frequency>secondary word frequency, thus displaying the document closer to the user's retrieval intention as a more significant document in the retrieval result.

Seventh Embodiment

Figure 16:
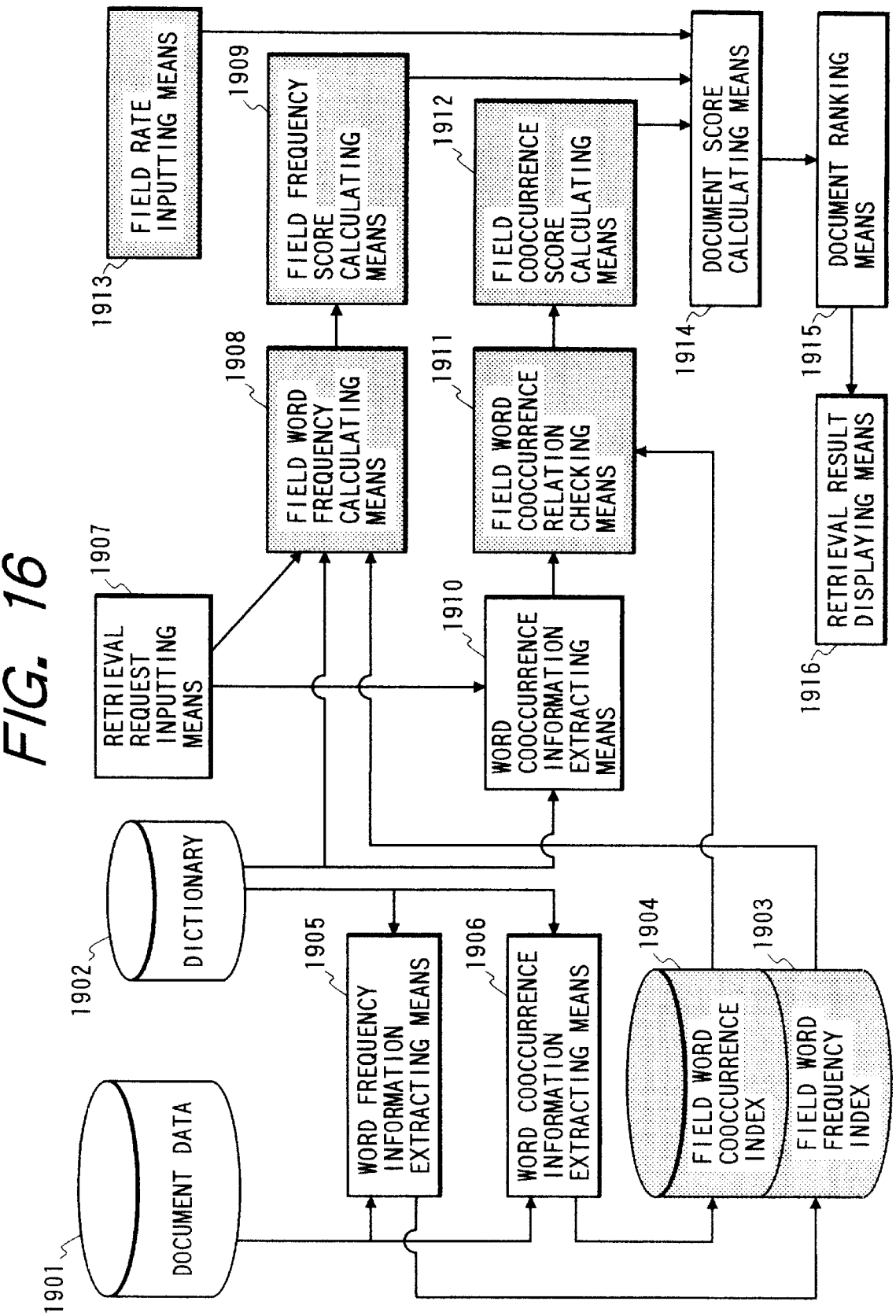
FIG. 16 is a block diagram showing an arrangement of a document retrieval system according to a seventh embodiment of the present invention.
Figure 17:
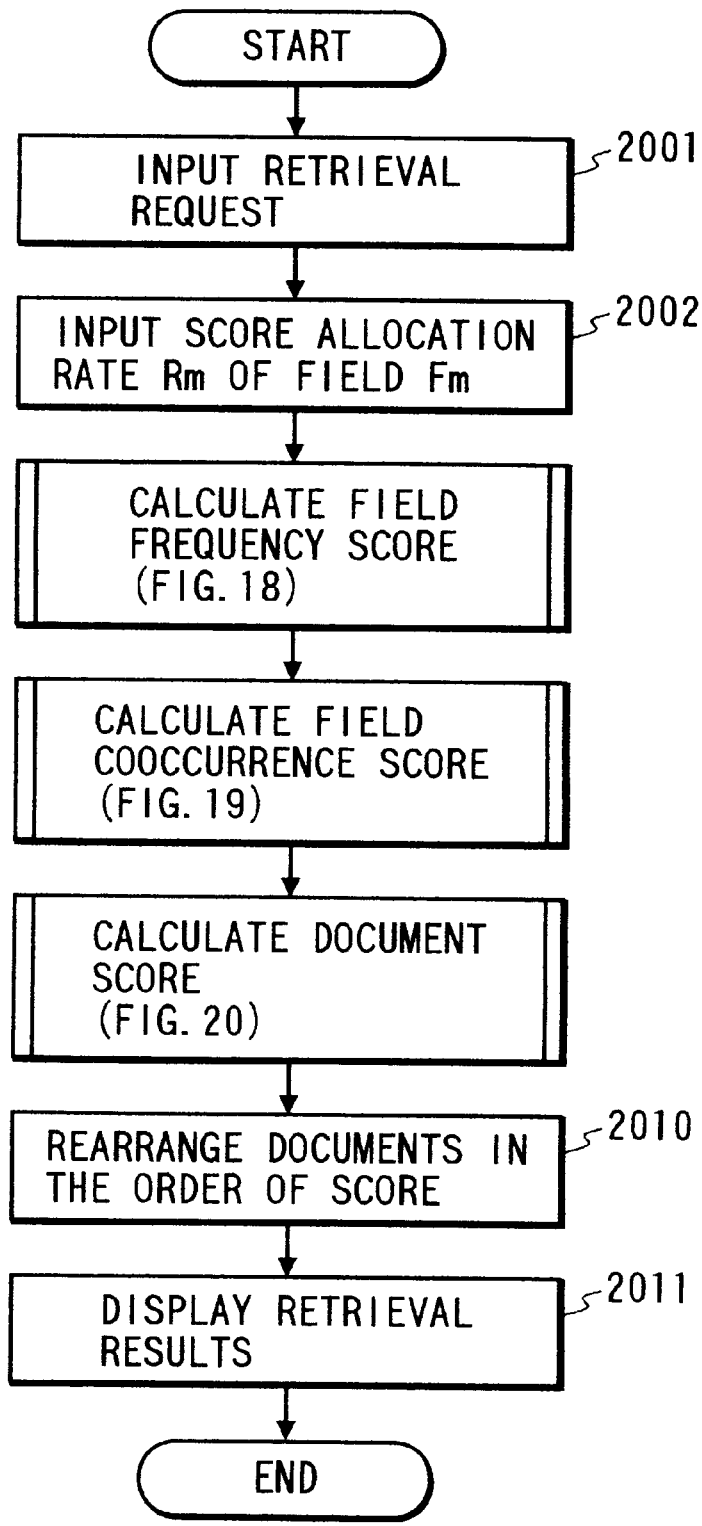
FIG. 17 is a flow chart showing a retrieval procedure of the document retrieval system according to the seventh embodiment of this invention.
Figure 18:
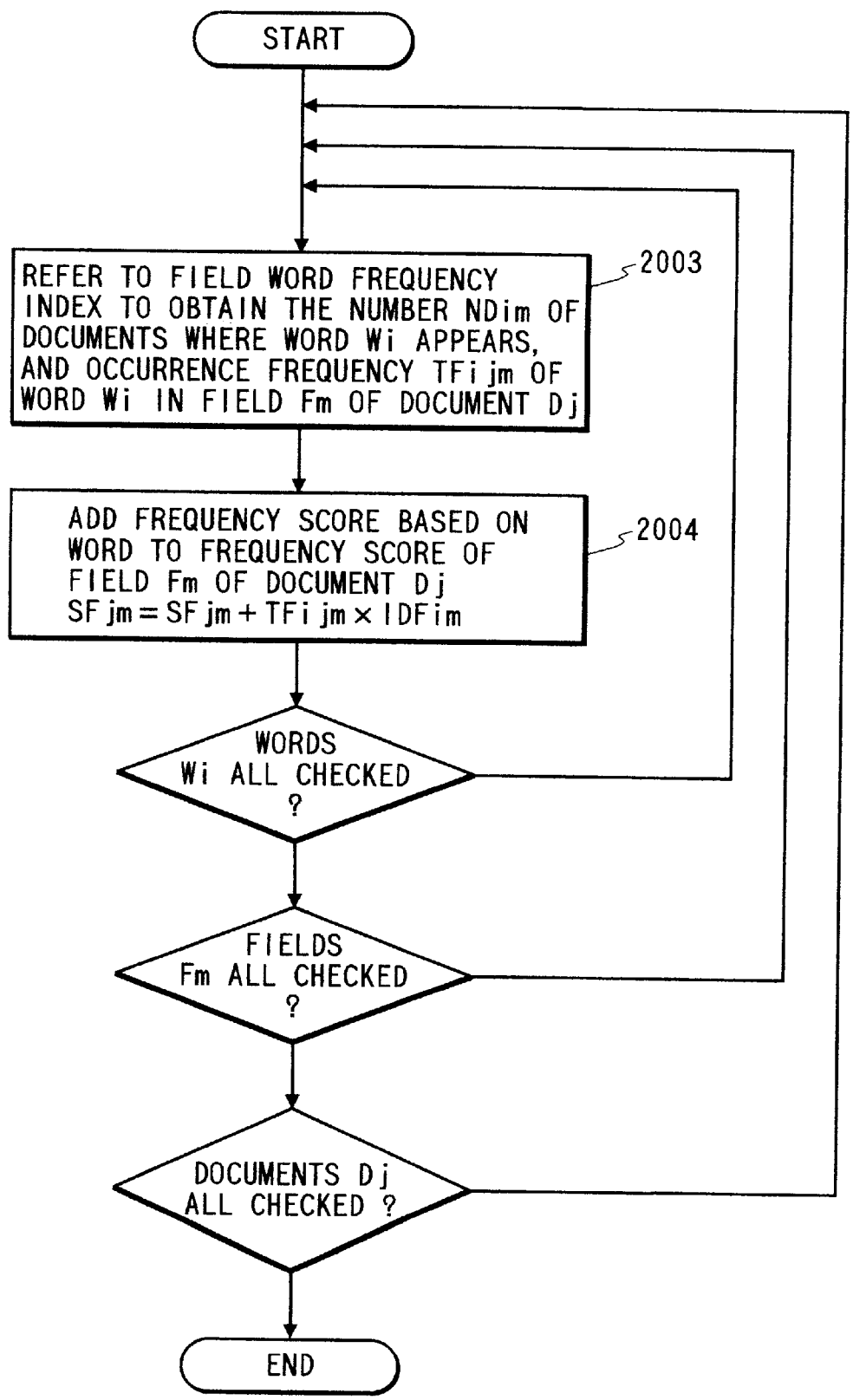
FIG. 18 is a flow chart showing a retrieval procedure of the document retrieval system according to the seventh embodiment of this invention.
Figure 19:
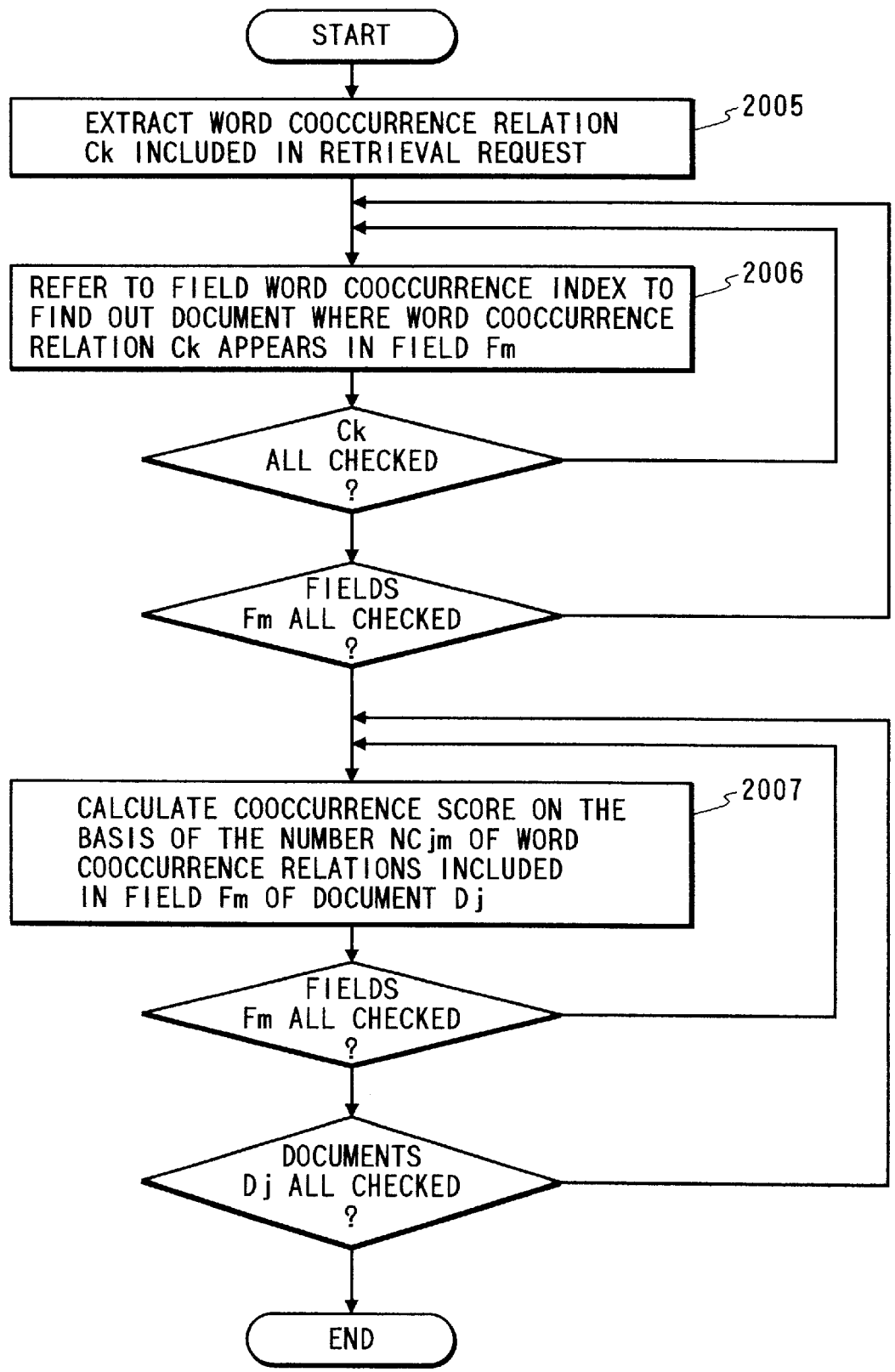
FIG. 19 is a flow chart showing a retrieval procedure of the document retrieval system according to the seventh embodiment of this invention.
Figure 20:
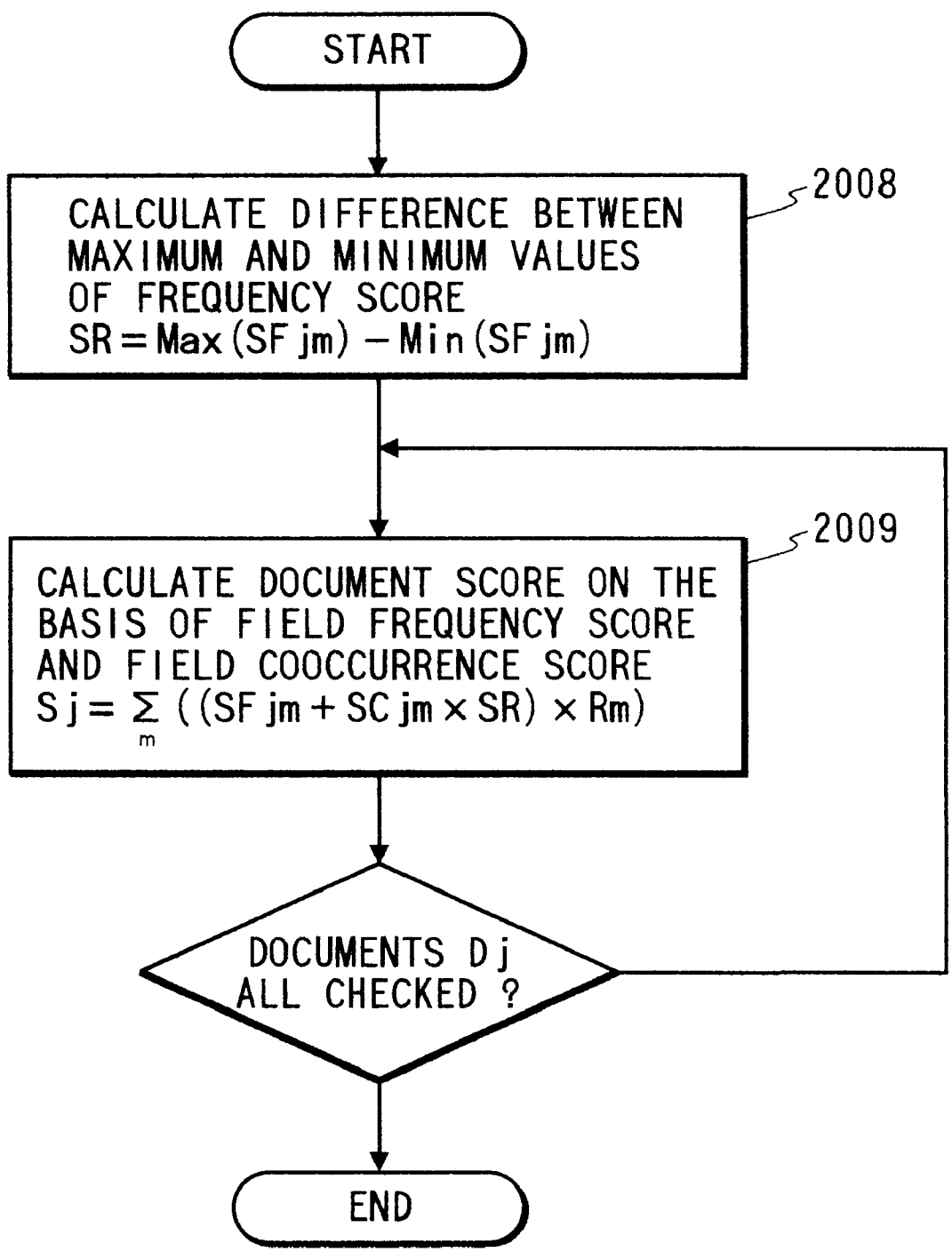
FIG. 20 is a flow chart showing a retrieval procedure of the document retrieval system according to the seventh embodiment of this invention.

FIG. 16 is a block diagram showing an arrangement of a document retrieval system according to a seventh embodiment of the present invention. In FIG. 16, the document retrieval system comprises document data 1901 undergoing the retrieval, a dictionary 1902, a field word frequency index 1903 for storing a frequency of occurrence of a dictionary word in a target document at every field, a field word cooccurrence index 1904 for storing word cooccurrence information appearing in the target document at every field, a word frequency information extracting means 1905 for extracting word frequency information from the document data 1901 to put the word frequency information in the field word frequency index 1903, a word cooccurrence information extracting means 1906 for extracting word cooccurrence information from the document data 1901 to store the word cooccurrence information in the field word cooccurrence index 1904, a retrieval request inputting means 1907 through which the user inputs a retrieval request, a field word frequency calculating means 1908 for consulting the field word frequency index 1903 to find out a frequency of occurrence of a dictionary word included in the retrieval request inputted through the retrieval request inputting means 1907 at every field in a document, a field frequency score calculating means 1909 for obtaining a frequency score at every field of each document on the basis of word frequency obtained in the field word frequency calculating means 1908, a word cooccurrence information extracting means 1910 for extracting word cooccurrence information from the retrieval request inputted through the retrieval request inputting means 1907, a field word cooccurrence relation checking means 1911 for referring to the contents of the field word cooccurrence index 1904 to find out the number of word cooccurrence relations included in the retrieval request outputted from the word cooccurrence information extracting means 1901 and appearing in a field of each document, a field cooccurrence score calculating means 1912 for calculating a cooccurrence score at every field of each document on the basis of the number of word cooccurrence relations appearing in common in a field of each document and the retrieval request which is obtained in the field word cooccurrence relation checking means 1911, a field rate inputting means 1913 through which the user inputs a rate representative of the degree of influence of a score of each field on the ranking of a document, a document score calculating means 1914 for calculating a final score for each document on the basis of the output of the field frequency score calculating means 1909, the output of the field cooccurrence score calculating means 1912 and the output of the field rate inputting means 1913, a document ranking means 1915 for rearranging documents in the order of score, and a retrieval result displaying means 1916 for displaying the resultant documents arranged in the order of score.

FIGS. 17 to 20 are flow charts showing a retrieval procedure in the document retrieval system according to the seventh embodiment of this invention. Prior to the retrieval, the word frequency information extracting means 1905 scans the document data 1901 to look up a frequency of occurrence of a dictionary word included in the dictionary 1902 at every field in each document and outputs the occurrence frequency together with the total number of documents and the number of documents where that word appears to the field word frequency index 1903, whereas the word concurrence information extracting means 1906 scans the document data 1901 to obtain word cooccurrence information at every field in each document and outputs the word cooccurrence information to the field word cooccurrence index 1904, thus making an index out. As a method of attaining the word cooccurrence information, for example there is a way of deciding that a pair of words appearing in the same sentence are in a cooccurrence relation to each other and of extracting them or a way of carrying out a morpheme analysis to extract a pair of words which are in NP—NP, subject-predicate or object-predicate relation.

At a step 2001, through the retrieval request inputting means 1907 the user inputs a retrieval request for a document the user searches. In addition, at a step 2002, the user uses the field rate inputting means 1913 to input a rate Rm of influence of a score of a field Fm (m=1, 2, . . . , NF where NF designates the total number of fields) on the ranking.

At a step 2003 the field word frequency calculating means 1908 refers to the field word frequency index 1903 to find out the total number ND of documents and calculates a frequency of occurrence TFijm of the dictionary word Wi (i=1, 2, . . . , NW where NW corresponds to the number of dictionary words included in the retrieval request) included in the retrieval request inputted through the retrieval request inputting means 1907 in the field Fm of a document Dj (j=1, 2, . . . , ND) and further calculates the number NDim of documents in which that word appears in the field Fm, and outputs them to the field frequency score calculating means 1909.

At a step 2004 the field frequency score calculating means 1909 calculates a frequency score SFjm indicative of the degree of coincidence between the field Fm of the document Dj based upon the word frequency and the retrieval request according to the above-mentioned equation (6) on the basis of the total number ND of documents, the number NDim of documents where the word Wi appears in the field Fm, and the occurrence frequency TFijm of the word Wi in the field Fm of the document Dj outputted from the field word frequency calculating means 1908, and outputs the frequency score SFjm to the document score calculating means 1914. In this case, the frequency score based on the word frequency is added to the frequency score of the field Fm of the document Dj.

At a step 2005 the word cooccurrence information extracting means 1910 extracts a cooccurrence relation Ck (k=1, 2, . . . , NC where NC depicts the number of word cooccurrence relations included in the retrieval request) from the retrieval request inputted through the retrieval request inputting means 1907 according to the same method as the index production, and outputs the cooccurrence relation Ck to the field word cooccurrence relation checking means 1911.

At a step 2006, the field word cooccurrence relation checking means 1911 refers to the field word cooccurrence index 1904 to calculate the number NCjm of word cooccurrence relations of the word cooccurrence relations appearing in the field Fm of the document Dj which are coincident with the word cooccurrence relation Ck attained by the word cooccurrence information extracting means 1910, and outputs the number NCjm of word cooccurrence relations coinciding with the word cooccurrence relation Ck to the field cooccurrence score calculating means 1912.

At a step 2007 the field cooccurrence score calculating means 1912 calculates a cooccurrence score SCjm of the field Fm of the document Dj according to the following equation (16) and outputs the cooccurrence score SCjm to the document score calculating means 1914.

$$SCjm = NCjm \tag{16}$$

At a step 2008 the document score calculating means 1914 calculates a difference SR between the maximum value and the minimum value f the field frequency score according to the following equation (17).

$$SR = \text{Max}(SFjm) - \text{Min}(SFjm) \tag{17}$$

At a step 2009 the document score calculating means 1914 calculates a document score Sj indicative of the degree of coincidence between the document Dj and the retrieval request according to the following equation (18) on the basis of the field frequency score SFjm of each field outputted from the field frequency score calculating means 1909, the cooccurrence score SCjm of each field outputted from the field cooccurrence score calculating means 1912 and the score allocation rate Rm inputted through the field rate inputting means 1913.

$$Sj = \sum_m ((SFjm + SCjm \times SR) \times Rm) \qquad (18)$$

At a step 2010 the document ranking means 1915 rearranges the documents in the order of decreasing document score Sj of each document Dj outputted from the document score calculating means 1914, and at a step 2011 the retrieval result displaying means 1916 displays as the retrieval result to the user the sorted documents obtained from the output of the document ranking means 1915.

As described above, the user can change the rate of score allocation of the target field, and hence it is possible to flexibly express the user's retrieval intention and further to achieve the effective retrieval.

Eighth Embodiment

Figure 21:
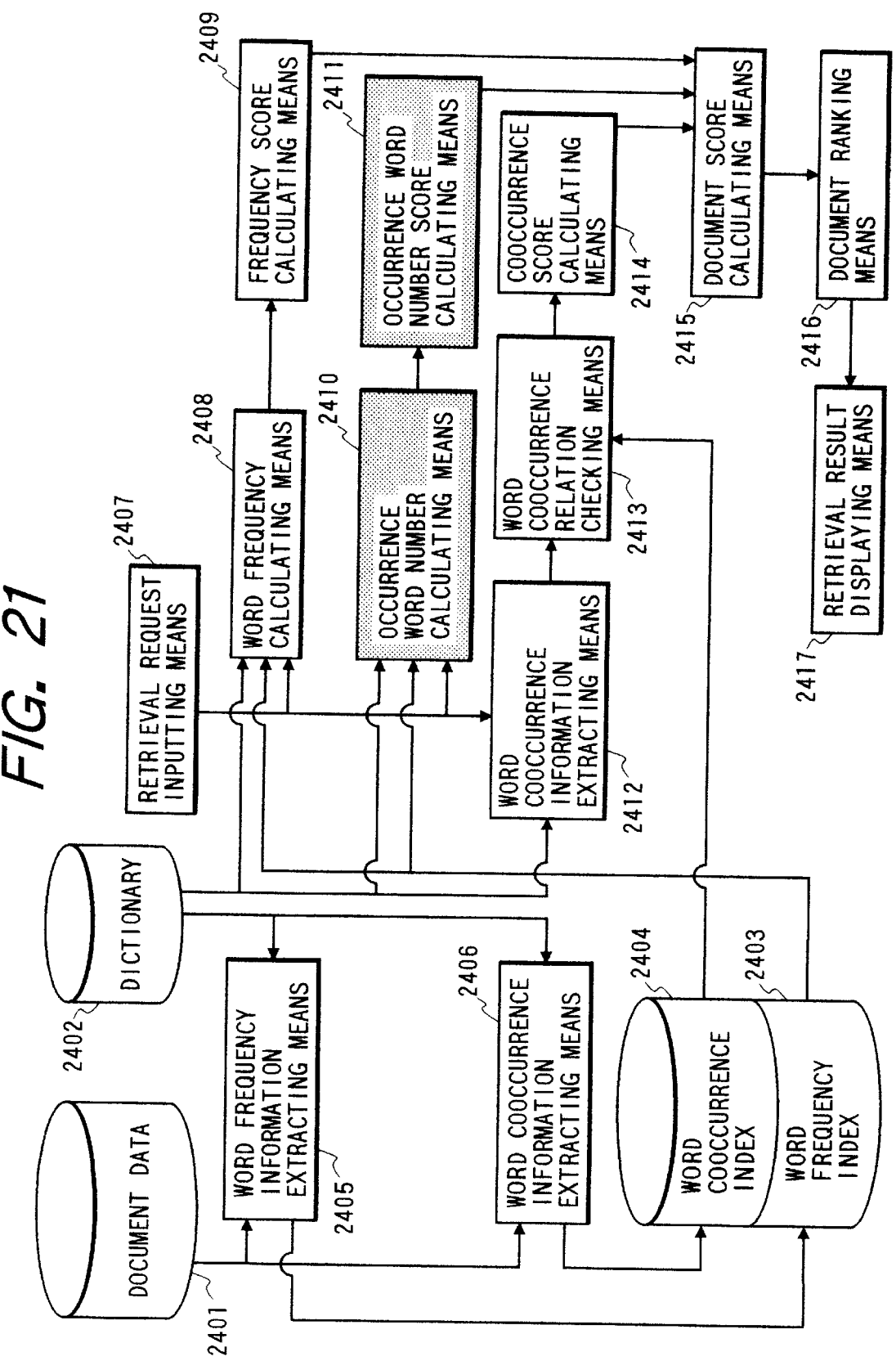
FIG. 21 is a block diagram showing an arrangement of a document retrieval system according to an eighth embodiment of the present invention.
Figure 22:
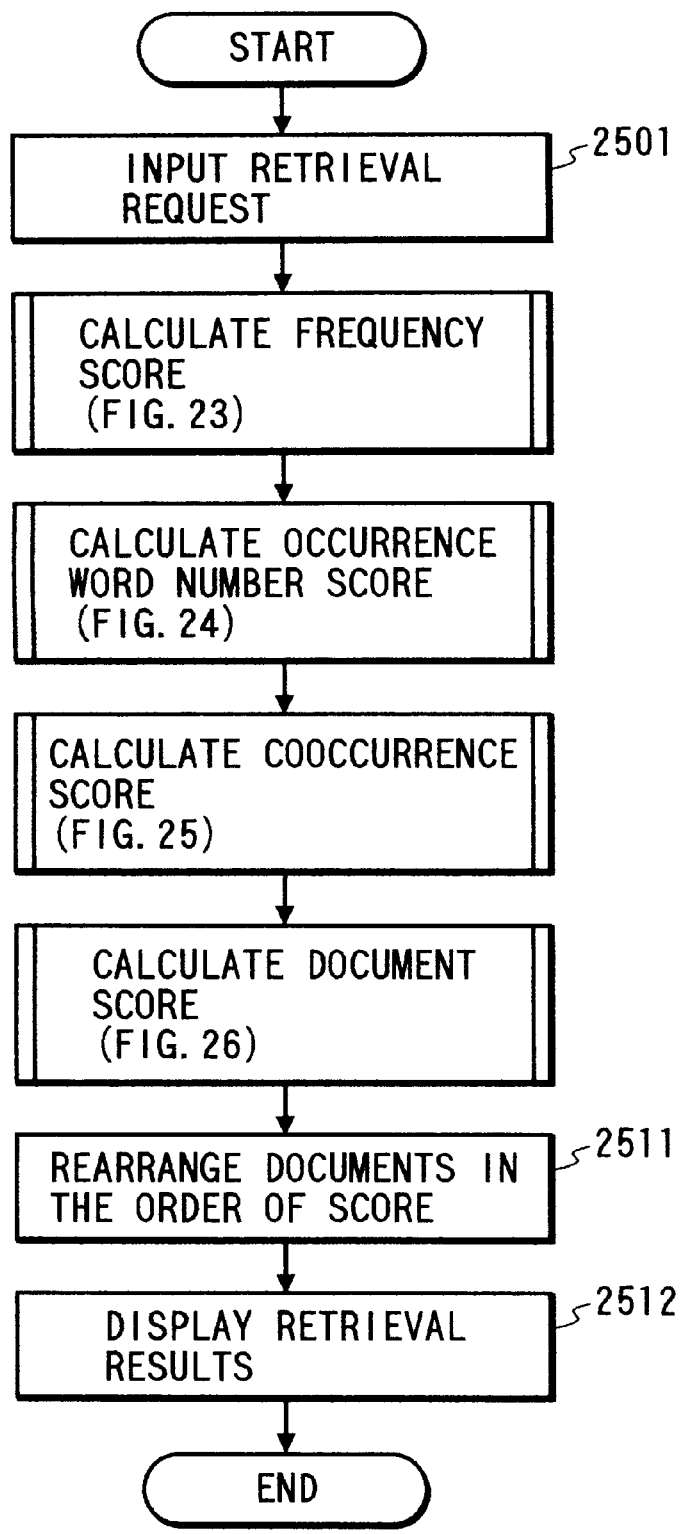
FIG. 22 is a flow chart showing a retrieval procedure of the document retrieval system according to the eighth embodiment of this invention.
Figure 23:
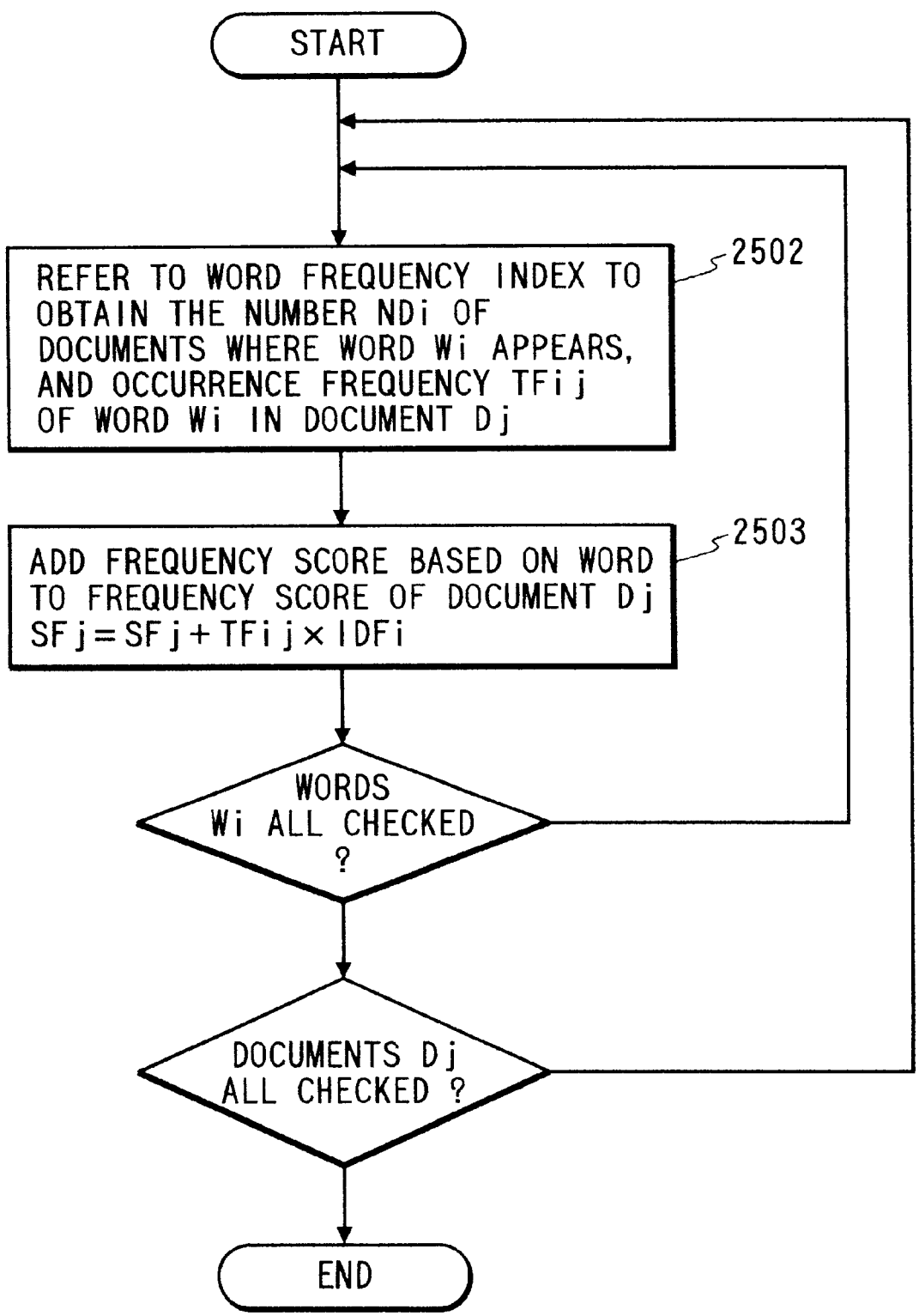
FIG. 23 is a flow chart showing a retrieval procedure of the document retrieval system according to the eighth embodiment of this invention.
Figure 24:
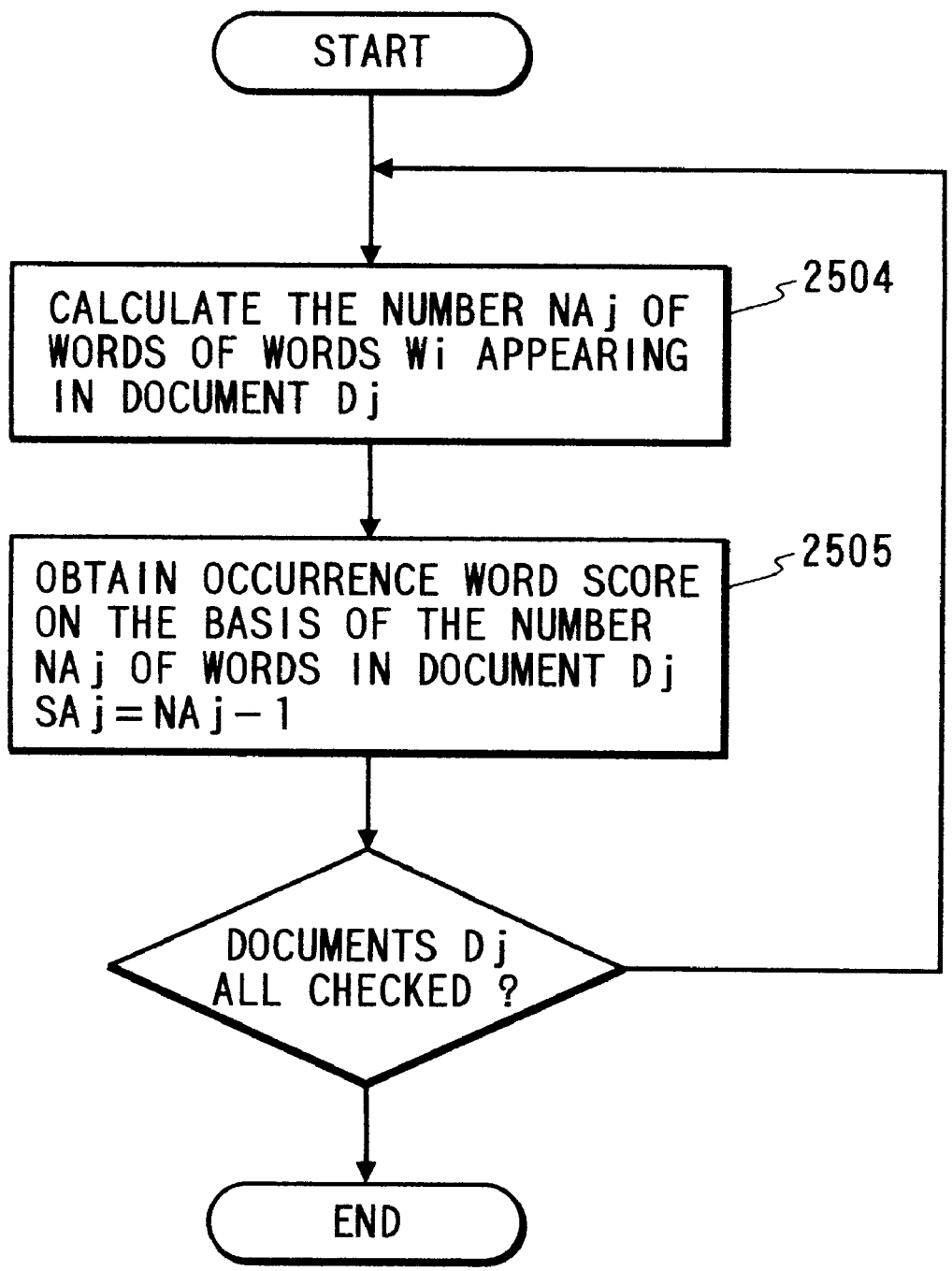
FIG. 24 is a flow chart showing a retrieval procedure of the document retrieval system according to the eighth embodiment of this invention.
Figure 25:
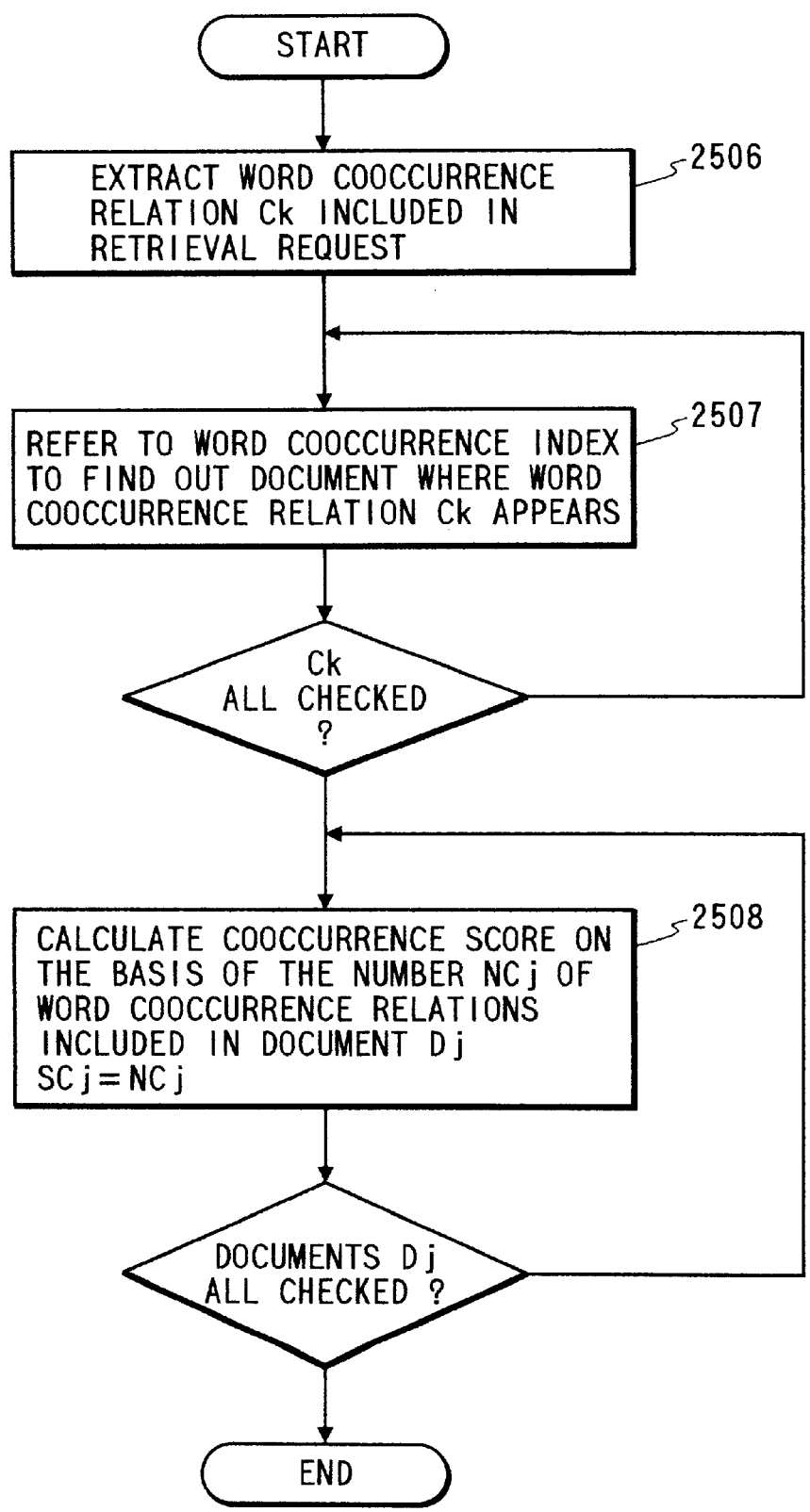
FIG. 25 is a flow chart showing a retrieval procedure of the document retrieval system according to the eighth embodiment of this invention.
Figure 26:
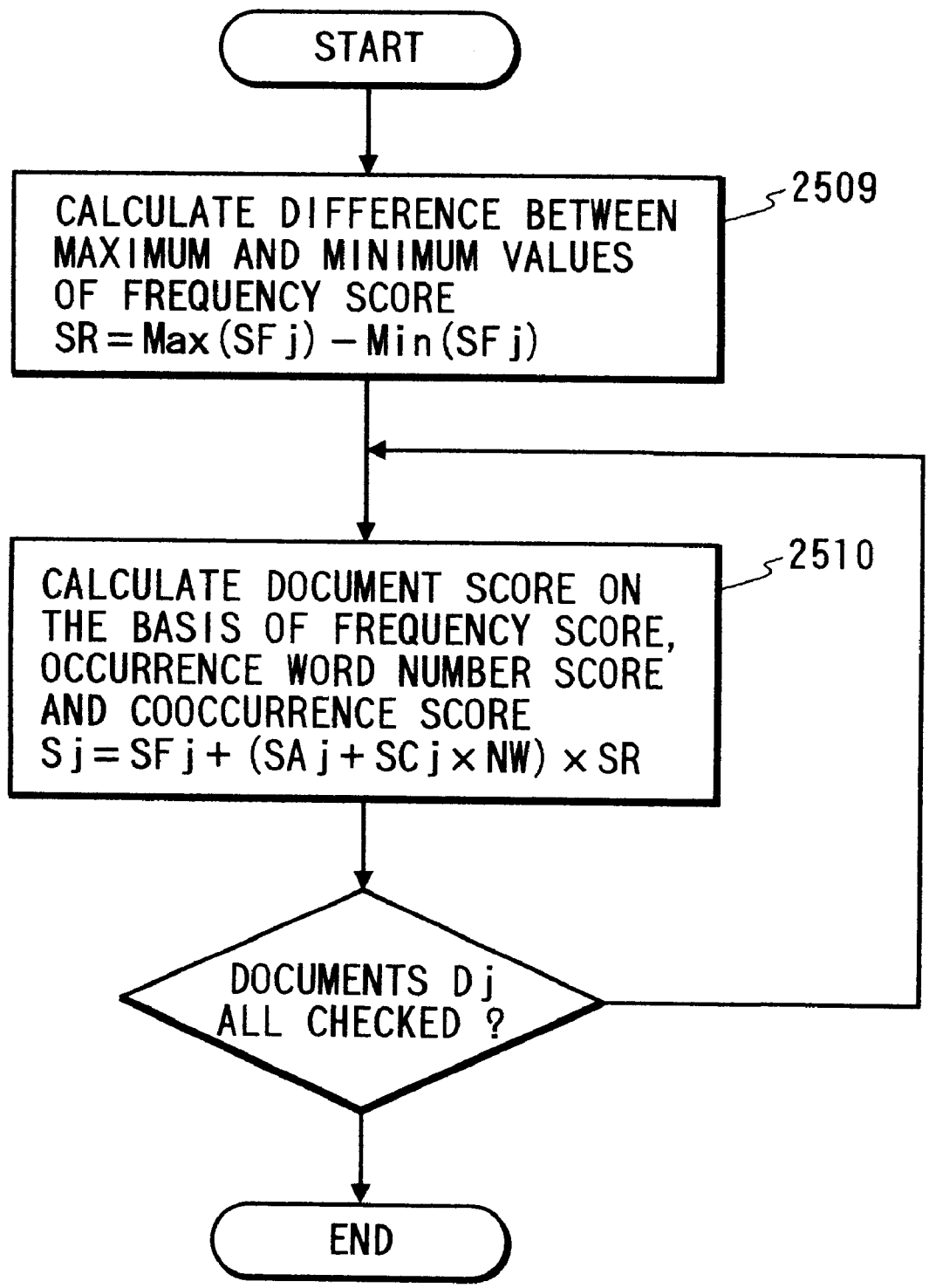
FIG. 26 is a flow chart showing a retrieval procedure of the document retrieval system according to the eighth embodiment of this invention.
Figure 27:
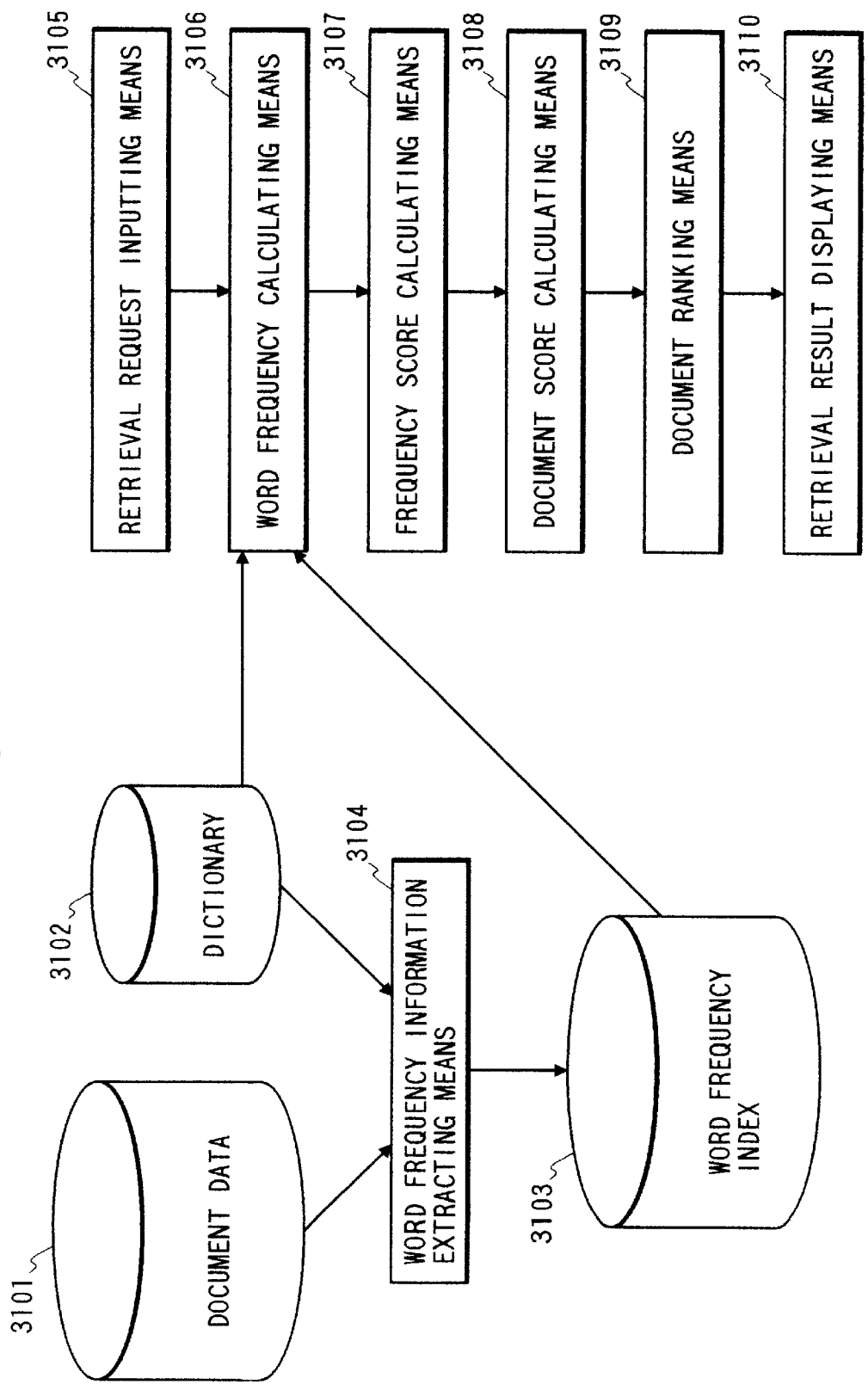
FIG. 27 is a block diagram showing an arrangement of a prior document retrieval system.
Figure 28:
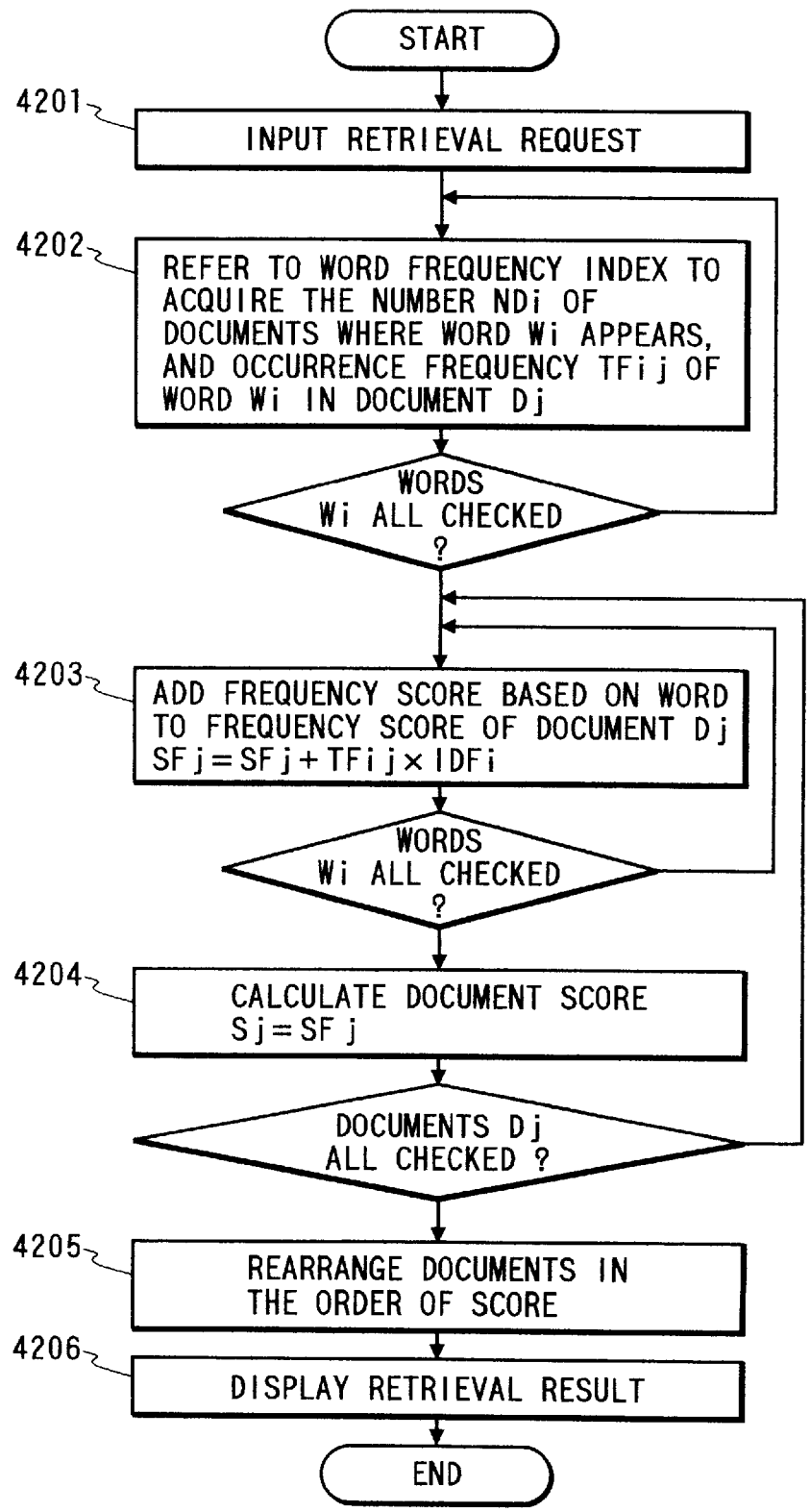
FIG. 28 is a flow chart showing a retrieval procedure in the prior document retrieval system.

FIG. 21 is a block diagram showing an arrangement of a document retrieval system according to an eighth embodiment of the present invention. In FIG. 21, the document retrieval system comprises document data 2401 undergoing the retrieval, a dictionary 2402, a word frequency index 2403 for storing a frequency of occurrence of a dictionary word in a target document, a word cooccurrence index 2404 for storing word cooccurrence information occurring in the target document, a word frequency information extracting means 2405 for extracting word frequency information from the document data 2401 to store it in the word frequency index 2403, a word cooccurrence information extracting means 2406 for extracting word cooccurrence information from the document data 2401 to put it in the word cooccurrence index 2404, a retrieval request inputting means 2407 through which the user inputs a retrieval request, a word frequency calculating means 2408 for consulting the word frequency index 2403 to calculate a frequency of occurrence of a dictionary word, included in the retrieval request inputted through the retrieval request inputting means 2407, in a document, a frequency score calculating means 2409 for obtaining a frequency score of each document on the basis of the word frequency obtained by the word frequency calculating means 2408, an occurrence word number calculating means 2410 for consulting the word frequency index 2403 to obtain the number of dictionary words included in the retrieval request inputted through the retrieval request inputting means 2407 and appearing in each document, an occurrence word number score calculating means 2411 for calculating an occurrence word number score on the basis of the number of occurrence words obtained by the occurrence word number calculating means 2410, a word cooccurrence information extracting means 2412 for extracting word cooccurrence information from the retrieval request inputted through the retrieval request inputting means 2407, a word cooccurrence relation checking means 2413 for referring to the contents of the word cooccurrence index 2404 to calculate the number of word cooccurrence relations of the word cooccurrence relations of the retrieval request outputted from the word cooccurrence information extracting means 2412 which appear in each document, a cooccurrence score calculating means 2414 for obtaining a cooccurrence score of each document on the basis of the number of word cooccurrence relations occurring in common in the retrieval request and the document which is obtained by the word cooccurrence relation checking means 2413, a document score calculating means 2415 for calculating a final score of each document on the basis of the output of the frequency score calculating means 2409, the output of the occurrence word number score calculating means 2411 and the output of the cooccurrence score calculating means 2415, a document ranking means 2416 for rearranging the documents in order of score, and a retrieval result displaying means 2417 for displaying the resultant documents arranged in order of score.

FIGS. 22 to 26 are flow charts showing a retrieval procedure in the document retrieval request according to the eighth embodiment of this invention. Prior to the retrieval, the word frequency information extracting means 2405 scans the document data 2401 to find out a frequency of occurrence of a dictionary word, included in the dictionary 2402, in each document and outputs the occurrence frequency together with the total number of documents, the number of documents where the word appears to the word frequency index 2403, whereas the word cooccurrence information extracting means 2406 scans the document data 2401 to find out word cooccurrence information in each document and outputs it to the word cooccurrence index 2404, thus make an index out. As a method of attaining the word cooccurrence information, for example there is a way of deciding that a pair of words appearing in the same sentence are in a cooccurrence relation to each other and of extracting them or a way of carrying out a morpheme analysis to extract a pair of words which are in NP—NP, subject-predicate or object-predicate relation.

At a step 2501 the user uses the retrieval request inputting means 2407 to input a retrieval request for a document the user wants to search. At a step 2502 the word frequency calculating means 2408 refers to the word frequency index 2403 to know the total number ND of documents and further to attain a frequency of occurrence TFij of a dictionary word Wi (i=1, 2, . . . , NW where NW corresponds to the number of dictionary words included in the retrieval request), included in the retrieval request inputted through the retrieval request inputting means 2407, in a document Dj (j=1, 2, . . . , ND) and further to obtain the number NDi of documents where that words Wi appear and further outputs them to the frequency score calculating means 2409.

At a step 2503 the frequency score calculating means 2409 calculates a frequency score SFj indicative of the degree of coincidence between the document due to the word frequency and the retrieval request according to the above-mentioned equation (1) on the basis of the total number ND of documents, the number NDi of documents where the word Wi appears and the occurrence frequency TFij of the word Wi in the document Dj. In this case, the frequency score based on the word frequency is added to the frequency score of the document Dj.

At a step 2504 the occurrence word number calculating means 2410 refers to the word frequency index 2403 to calculate the number NAj of words of the dictionary words Wi included in the retrieval request inputted through the retrieval request inputting means 2407 which also occur in the document Dj, and outputs the number NAj to the occurrence word number score calculating means 2411.

At a step 2505 the occurrence word number score calculating means 2411 calculates an occurrence word number score according to the above-mentioned equation (8) on the basis of the number NAj of occurrence words the occurrence word number calculating means 2410 gives, and outputs the occurrence word number score to the document score calculating means 2415.

At a step 2506 the word cooccurrence information extracting means 2412 extracts a cooccurrence relation Ck (k=1, 2, . . . , NC where NC depicts the number of word cooccurrence relations included in the retrieval request) from the retrieval request inputted through the retrieval request inputting means 2407 through the use of a method similar to that for the index production, and outputs the cooccurrence relation Ck to the word cooccurrence relation checking means 2413.

At a step 2507 the word cooccurrence relation checking means 2413 refers to the word cooccurrence index 2404 to find out the document where each word cooccurrence relation Ck obtained by the word cooccurrence information extracting means 2404 appears, and calculates the number NCj of word cooccurrence relations of the word cooccurrence relations Ck and outputs the resultant to the cooccurrence score calculating means 2414.

At a step 2508 the cooccurrence score calculating means 2414 calculates a cooccurrence score SCj of the document Dj according to the above-mentioned equation (3) and outputs the cooccurrence score SCj to the document score calculating means 2415. At a step 2509 the document score calculating means 2415 calculates a difference SR between the maximum and minimum values of the frequency score according to the above-mentioned equation (14).

At a step 2510 the document score calculating means 2415 calculates a document score Sj representative of the degree of coincidence between the document Dj and the retrieval request according to the following equation (19) on the basis of the frequency score SFj being the output of the frequency score calculating means 2409, the occurrence word number score SAj being the output of the occurrence word number score calculating means 2411 and the cooccurrence score SCj being the output of the cooccurrence score calculating means 2414.

$$Sj = SFj + (SAj + SCj \times NW) \times SR \tag{19}$$

At a step 2511 the document ranking means 2416 rearranges the documents in the order of decreasing document score Sj of each document Dj outputted from the document score calculating means 2415, and at a step 2512 the retrieval result displaying means 2417 displays as the retrieval result to the user the sorted documents obtained from the output of the document ranking means 2416.

As described above, as a criterion for deciding the degree of coincidence between the document and the retrieval request, in addition to the word frequency, the cooccurrence relation and the number of occurrence words are taken, so that the precedence is made in order of cooccurrence relation>occurrence word number>word frequency, with the result that the document closer to the user's retrieval intention can be displayed at a high rank in the retrieval result, thus accomplishing the retrieval with a high accuracy and efficiency.

As described before, in the document retrieval system according to this invention, the index has the word cooccurrence information in the target document and the word cooccurrence relation checking means is provided to check whether or not the word cooccurrence relation included in the retrieval request appears in the target document, and the index information associated with each field of the target document is prepared and the field rate inputting means is provided so that the user can specify the rate of the field influencing on the ranking, and further the plurality of retrieval request inputting means are provided to input a plurality of retrieval requests having difference priorities, and the occurrence word number calculating means is provided to calculate the number of words of a plurality of words of the retrieval request included in the target document, and the index has the word occurrence position information in the target document and the word proximity calculating means is provided to check whether or not the occurrence positions of a plurality of words of the retrieval request are adjacent to each other or relatively close to each other. Accordingly, it is possible to flexibly receive the user's request and to carry out the retrieval and ranking.

Furthermore, a document retrieval system is equipped with indexes including the word occurrence frequency and the word cooccurrence information in the target document at every field, the field rate inputting means through which the user can specify the field rate of influence on the ranking of the target document and the field word cooccurrence relation checking means for checking whether or not the word cooccurrence relation included in the retrieval request appears in the target document. Still further, a document retrieval system comprises the indexes including the word occurrence frequency and the word cooccurrence information in the target document, the occurrence word number calculating means for calculating how many of a plurality of words included in the retrieval request appear in the target document, and the word cooccurrence relation checking means for checking whether or not the word cooccurrence relation included in the retrieval request appears in the target document. These arrangements allow the flexible acceptance of the retrieval request from the user and the execution of the retrieving and ranking operations.

Thus, it is possible to produce the retrieval result with a high accuracy but with less refuse and further to shorten the retrieval time as a whole, for example, by narrowing down the resultant documents It should be understood that the foregoing relates to only preferred embodiments of the present invention, and that it is intended to cover all changes and modifications of the embodiments of the invention herein used for the purpose of the disclosure, which do not constitute departures from the spirit and scope of the invention.

What is claimed is:

1. A document retrieval system which searches a target document to be retrieved in response to a retrieval request and ranks a retrieval result, said system retaining index information for each of a plurality of fields of said target document and comprising: a field rate inputting means for allowing the user to specify a rate of influence of a field on a ranking of said retrieval result, and for allowing the user to specify said rate of influence of any field on the ranking of said retrieval result.

2. A document retrieval system which searches a target document to be retrieved in response to a retrieval request and ranks retrieval results, comprising:

a word frequency index for storing a frequency of occurrence of a dictionary word in said target document;

a word cooccurrence index for storing word cooccurrence information appearing in said target document;

word frequency information extracting means for extracting word frequency information from document data to be retrieved to store it in said word frequency index;

word cooccurrence information extracting means for extracting word cooccurrence information from said document data to store it in said word cooccurrence index;

retrieval request inputting means through which the user inputs said retrieval request;

word frequency calculating means for consulting said word frequency index to obtain an occurrence frequency of a dictionary word, included in said retrieval request inputted through said retrieval request inputting means, in a document of said document data;

frequency score calculating means for calculating a frequency score of said document indicative of a degree of coincidence between said retrieval request and said document on the basis of said word occurrence frequency obtained through said word frequency calculating means;

word cooccurrence information extracting means for extracting word cooccurrence information from said retrieval request;

word cooccurrence relation checking means for referring to said word cooccurrence index to find out how many word cooccurrence relations included in said retrieval request and outputted from said word cooccurrence information extracting means appear in said document;

cooccurrence score calculating means for calculating a cooccurrence score of said document on the basis of a quantity of said word cooccurrence relation appearing in common in said retrieval request and said document;

document score calculating means for calculating a document score on the basis of the output of said frequency score calculating means and the output of said cooccurrence score calculating means;

document ranking means for rearranging said target documents being retrieval results in the order of document score obtained by said document score calculating means; and retrieval result displaying means for displaying said retrieval results ranked.

3. A document retrieval system which searches a target document to be retrieved in response to a retrieval request and ranks retrieval results, comprising:

a word frequency index for storing a frequency of occurrence of a dictionary word in said target document;

word frequency information extracting means for extracting word frequency information from document data to be retrieved to store it in said word frequency index;

primary retrieval request inputting means for allowing the user to input a first retrieval request to be dealt with preferentially;

secondary retrieval request inputting means for allowing the user to input a second retrieval request having a lower precedence than that of said first retrieval request;

word frequency calculating means for consulting said word frequency index to obtain a frequency of occurrence of a dictionary word, included in said first and second retrieval requests, in a document of said document data;

frequency score calculating means for calculating a frequency score of said document indicative of a degree of coincidence between said document and one of said first and second retrieval requests on the basis of said word occurrence frequency obtained in said word frequency calculating means;

document score calculating means for calculating a document score of said document indicative of said document and one of said first and second retrieval requests on the basis of said frequency score outputted from said frequency score calculating means;

document ranking means for rearranging said target documents being retrieval results in the order of document score obtained by said document score calculating means; and retrieval result displaying means for displaying said retrieval results ranked.

4. A document retrieval system which searches a target document to be retrieved in response to a retrieval request and ranks retrieval results, comprising:

a field word frequency index for storing a frequency of occurrence of a dictionary word in said target document at every field;

word frequency information extracting means for extracting word frequency information from document data to be retrieved and for putting it in said field word frequency index;

retrieval request inputting means for allowing the user to input said retrieval request;

field rate inputting means for allowing the user to input a rate indicative of a degree of influence of a score of a field of a document on a document score;

field word frequency calculating means for consulting said field word frequency index in terms of a dictionary word included in said retrieval request to obtain a frequency of occurrence of said dictionary word in said document;

field frequency score calculating means for calculating a frequency score indicative of a degree of coincidence between a field of each document and said retrieval request on the basis of said word occurrence frequency acquired in said field word frequency calculating means;

document score calculating means for calculating a document score indicative of a degree of coincidence between said document and said retrieval request on the basis of said word occurrence frequency of said field outputted from said field frequency score calculating means and said rate inputted to said field rate inputting means;

document ranking means for rearranging said target documents being retrieval results in the order of document score obtained by said document score calculating means; and retrieval result displaying means for displaying said retrieval results ranked.

5. A document retrieval system which searches a target document to be retrieved in response to a retrieval request and ranks retrieval results, comprising:

a word frequency index for storing a frequency of occurrence of a dictionary word in said target document;

an occurrence word index for storing a list of words which emerge in said target document;

word frequency information extracting means for deriving word frequency information from document data to be retrieved and further for storing it in said word frequency index;

occurrence word information extracting means for deriving occurrence word information from said document data and further for retaining it in said occurrence word index;

retrieval request inputting means through which the user inputs said retrieval request;

word frequency calculating means for consulting said word frequency index to calculate a frequency of occurrence of a dictionary word, included in said target request, in a document of said document data;

frequency score calculating means for calculating a score of said document indicative of a degree of coincidence between said document and said retrieval request on the basis of said word occurrence frequency attained in said word frequency calculating means;

occurrence word number calculating means for referring to said occurrence word index to find out how many words of words included in said retrieval request appear in said document;

occurrence word score calculating means for obtaining an occurrence word score to be added to said document on the basis of the number of occurrence words attained in said occurrence word number calculating means;

document score calculating means for calculating a document score of said document indicative of a degree of coincidence between said retrieval request and said document on the basis of said frequency score outputted from said frequency score calculating means and said occurrence word score output from said occurrence word number score calculating means;

document ranking means for rearranging said target documents being retrieval results in the order of document score obtained by said document score calculating means; and retrieval result displaying means for displaying said retrieval results ranked.

6. A document retrieval system which searches a target document to be retrieved in response to a retrieval request and ranks retrieval results, comprising:

a word frequency index for storing a frequency of occurrence of a dictionary word in said target document;

a word occurrence position index for storing a position of a word appearing in said target document;

word frequency information extracting means for extracting word frequency information from document data to be retrieved and further for storing it in said word frequency index;

word occurrence position information extracting means for acquiring word position information from said document data and further for retaining it in said word occurrence position index;

retrieval request inputting means through which the user inputs said retrieval request;

word frequency calculating means for consulting said word frequency index to calculate an occurrence frequency of a dictionary word, included in said retrieval request, in a document of said document data;

frequency score calculating means for obtaining a score of said document indicative of a degree of coincidence between said document and said retrieval request on the basis of said word occurrence frequency attained in said word frequency calculating means;

occurrence position calculating means for referring to said word occurrence position index to obtain an occurrence position of a word, included in said retrieval request, in said document;

word proximity calculating means for calculating a degree of proximity between words of said document on the basis of said word occurrence positions outputted from said word occurrence position calculating means;

proximity score calculating means for attaining a proximity score to be given to said document, on the basis of the degree of proximity outputted from said word proximity calculating means;

document score calculating means for calculating a score of said document indicative of a degree of coincidence between said document and said retrieval request on the basis of said frequency score outputted from said frequency score calculating means and said proximity score outputted from said proximity score calculating means;

document ranking means for rearranging said target documents being retrieval results in the order of document score obtained by said document score calculating means; and retrieval result displaying means for displaying said retrieval results ranked.

7. A document retrieval system which searches a target document to be retrieved in response to a retrieval request and ranks retrieval results, comprising:

an index including a frequency of word occurrence and word cooccurrence information in said target document at every field;

field rate inputting means through which the user specifies a field rate of influence on the ranking of said target document at every field; and field word cooccurrence relation checking means for checking whether or not a word cooccurrence relation included in said retrieval request appears in said target document, wherein a score to be given to said target document where said cooccurrence relation appears is increased so that said target document is displayed preferentially.

8. A document retrieval system which searches a target document to be retrieval in response to a retrieval request and ranks retrieval results, comprising:

an index including a word occurrence frequency and word cooccurrence information in said target document;

occurrence word calculating means for calculating the number of words of a plurality of words of said retrieval request which also appear in said target document; and word cooccurrence relation checking means for checking whether or not a word cooccurrence relation included in said retrieval request appears in said target document, wherein in cases where said plurality of words included in said retrieval request simultaneously appear in said target document and said word cooccurrence relation appears in said target document, a score to be given to said target document is increased so that said target document is displayed preferentially.

9. A document retrieval system which searches a target document to be retrieved in response to a retrieval request and ranks retrieval results, comprising:

a word frequency index for storing a frequency of occurrence of a dictionary word in said target document;

a word cooccurrence index for storing word cooccurrence information appearing in said target document;

word frequency information extracting means for extracting word frequency information from document data prepared and further for putting the extracted word frequency information in said word frequency index;

word cooccurrence information extracting means for extracting word cooccurrence information from said document data and further for putting the extracted word cooccurrence information in said word cooccurrence index;

primary retrieval request inputting means for allowing the user to input a primary retrieval request the user attaches importance to;

secondary retrieval request inputting means for allowing the user to input a secondary retrieval request the user attaches lower importance to as compared with said primary retrieval request;

word frequency calculating means for consulting said word frequency index to attain a frequency of occurrence of a dictionary word, included in said retrieval requests inputted through said primary retrieval request inputting means and said secondary retrieval request inputting means, in a document;

frequency score calculating means for calculating a frequency score of each document on the basis of the word occurrence frequency attained in said word frequency calculating means;

word cooccurrence information extracting means for extracting word cooccurrence information from said retrieval requests inputted through said primary retrieval request inputting means and said secondary retrieval request inputting means;

word cooccurrence relation checking means for referring to the contents of said word cooccurrence index to obtain the number of word cooccurrence relations included in said retrieval requests outputted from said word cooccurrence information extracting means and appearing in said document;

cooccurrence score calculating means for obtaining a cooccurrence score of said document on the basis of the number of word cooccurrence relations attained by said word cooccurrence relation checking means and appearing in common in said retrieval requests and said document;

document score calculating means for calculating a final score for said document on the basis of the frequency score outputted from said frequency score calculating means and the cooccurrence score outputted from said cooccurrence score calculating means;

document ranking means for rearranging said target documents being retrieval results in the order of document score obtained by said document score calculating means; and retrieval result displaying means for displaying said retrieval results ranked.

10. A document retrieval system which searches a target document to be retrieved in response to a retrieval request and ranks retrieval results, comprising:

a field word frequency index for storing a frequency of occurrence of a dictionary word in said target document at every field;

a field word cooccurrence index for storing word cooccurrence information appearing in said target document at every field;

word frequency information extracting means for extracting word frequency information from document data prepared and for putting the word frequency information in said field word frequency index;

word cooccurrence information extracting means for extracting word cooccurrence information from said document data and for putting the word cooccurrence information in said field word cooccurrence index;

retrieval request inputting means through which the user inputs said retrieval request;

field word frequency calculating means for consulting said field word frequency index to find out a frequency of occurrence of a dictionary word included in said retrieval request inputted through said retrieval request inputting means at every field in a document;

field frequency score calculating means for obtaining a frequency score at every field of said document on the basis of the word occurrence frequency obtained in said field word frequency calculating means;

word cooccurrence information extracting means for extracting word cooccurrence information from the retrieval request inputted through the retrieval request inputting means;

field word cooccurrence relation checking means for referring to the contents of said field word cooccurrence index to find out the number of word cooccurrence relations included in said retrieval request outputted from said word cooccurrence information extracting means and appearing in a field of said document;

field cooccurrence score calculating means for calculating a cooccurrence score at every field of said document on the basis of the number of word cooccurrence relations appearing in common in said field of said document and said retrieval request which is obtained in said field word cooccurrence relation checking means;

field rate inputting means through which the user inputs a rate representative of the degree of influence of a score of said field on the ranking of said document;

document score calculating means for calculating a final score for said document on the basis of the frequency score outputted from said field frequency score calculating means, the cooccurrence score outputted from said field cooccurrence score calculating means and the rate outputted from said field rate inputting;

document ranking means for rearranging said target documents being retrieval results in the order of document score obtained by said document score calculating means; and retrieval result displaying means for displaying said retrieval results ranked.

11. A document retrieval system which searches a target document to be retrieved in response to a retrieval request and ranks retrieval results, comprising:

a word frequency index for storing a frequency of occurrence of a dictionary word in said target document;

a word cooccurrence index for storing word cooccurrence information occurring in said target document;

word frequency information extracting means for extracting word frequency information from document data prepared and for storing said word frequency information in said word frequency index;

word cooccurrence information extracting means for extracting word cooccurrence information from said document data to put said word cooccurrence information in said word cooccurrence index;

retrieval request inputting means through which the user inputs said retrieval request;

word frequency calculating means for consulting said word frequency index to calculate a frequency of occurrence of a dictionary word, included in said retrieval request inputted through said retrieval request inputting means, in a document;

frequency score calculating means for obtaining a frequency score of said document on the basis of the word frequency obtained by said word frequency calculating means;

occurrence word number calculating means for consulting said word frequency index to obtain the number of dictionary words included in said retrieval request inputted through said retrieval request inputting means and appearing in said document;

occurrence word number score calculating means for calculating an occurrence word number score on the basis of the number of occurrence words obtained by said occurrence word number calculating means;

word cooccurrence information extracting means for extracting word cooccurrence information from said retrieval request inputted through said retrieval request inputting means;

word cooccurrence relation checking means for referring to the contents of said word cooccurrence index to calculate the number of word cooccurrence relations of the word cooccurrence relations of said retrieval request outputted from said word cooccurrence information extracting means which appears in said document;

cooccurrence score calculating means for obtaining a cooccurrence score of said document on the basis of the number of word cooccurrence relations occurring in common in said retrieval request and said document which is obtained by said word cooccurrence relation checking means;

document score calculating means for calculating a final score of said document on the basis of the frequency score outputted from said frequency score calculating means, the occurrence word number score outputted from said occurrence word number score calculating means and the cooccurrence score outputted from said cooccurrence score calculating means;

document ranking means for rearranging said target documents being retrieval results in the order of document score obtained by said document score calculating means; and retrieval result displaying means for displaying said retrieval results ranked.

* * * * *